US012767605B2

(12) United States Patent
Fukushima et al.

(10) Patent No.: US 12,767,605 B2
(45) Date of Patent: Oct. 20, 2026

(54) METHOD FOR COVERING FIBER BODY

(71) Applicants: IHI CORPORATION, Tokyo (JP); THE UNIVERSITY OF TOKYO, Tokyo (JP)

(72) Inventors: Yasuyuki Fukushima, Tokyo (JP); Kazuma Akikubo, Tokyo (JP); Yukihiro Shimogaki, Tokyo (JP); Takeshi Momose, Tokyo (JP)

(73) Assignees: IHI CORPORATION, Tokyo (JP); THE UNIVERSITY OF TOKYO, Tokyo (JP)

( * ) Notice: Subject to any disclaimer, the term of this patent is extended or adjusted under 35 U.S.C. 154(b) by 9 days.

(21) Appl. No.: 18/817,465

(22) Filed: Aug. 28, 2024

(65) Prior Publication Data

US 2024/0417333 A1 Dec. 19, 2024

Related U.S. Application Data

(63) Continuation of application No. PCT/JP2023/008355, filed on Mar. 6, 2023.

(30) Foreign Application Priority Data

Mar. 7, 2022 (JP) ................................ 2022-034285

(51) Int. Cl.
*C04B 35/80* (2006.01)
*C04B 35/628* (2006.01)
*D06M 10/06* (2006.01)

(52) U.S. Cl.
CPC ........ *C04B 35/80* (2013.01); *C04B 35/62863* (2013.01); *C04B 35/62884* (2013.01);
(Continued)

(58) Field of Classification Search
CPC ........................ C04B 35/80; C04B 2235/3826
See application file for complete search history.

(56) References Cited

U.S. PATENT DOCUMENTS 5,476,684 A 12/1995 Smith
5,523,133 A 6/1996 Smith
(Continued)

FOREIGN PATENT DOCUMENTS

JP 5-270931 A 10/1993
JP 2001-508388 A 6/2001
(Continued)

OTHER PUBLICATIONS

US 5,334,426 A, 08/1994, Smith (withdrawn)
International Search Report issued May 23, 2023 in PCT/JP2023/008355 filed on Mar. 6, 2023, 2 pages.

*Primary Examiner* — Robert A Vetere
(74) *Attorney, Agent, or Firm* — Oblon, McClelland, Maier & Neustadt, L.L.P.

(57) ABSTRACT

A method for covering a fiber body includes an impregnation condition determination process for, at a time of carrying out a chemical vapor infiltration to cover the fiber body with a ceramic, determining an infiltration temperature and an infiltration pressure that maximizes a film growth rate of the ceramic throughout the fiber body relative to the infiltration temperature; and an infiltration step for supplying a film gas including an ingredient of the ceramic to carry out the chemical vapor infiltration at the infiltration temperature and the infiltration pressure determined in the impregnation condition determination process.

13 Claims, 26 Drawing Sheets

(52) U.S. Cl.
CPC ..... *D06M 10/06* (2013.01); *C04B 2235/3826* (2013.01); *C04B 2235/614* (2013.01); *C04B 2235/656* (2013.01)

(56) References Cited

U.S. PATENT DOCUMENTS 6,197,374 B1 3/2001 Hüttinger et al.
2016/0297716 A1* 10/2016 Nakamura .............. C04B 35/80

FOREIGN PATENT DOCUMENTS

JP 2002-211985 A 7/2002
WO WO 2015/129772 A1 9/2015

* cited by examiner

S.C. = $T_b/T_t$

METHOD FOR COVERING FIBER BODY

CROSS-REFERENCE TO RELATED APPLICATIONS

This application is a continuation Application of PCT International Application No. PCT/JP2023/008355 (filed Mar. 6, 2023), which is in turn based upon and claims the benefit of priority from Japanese Patent Application No. 2022-034285 (filed Mar. 7, 2022), the entire contents of which are incorporated herein by reference.

BACKGROUND

The present disclosure relates to a method for covering a fiber body.

RELATED ART

In the fields of aircrafts, semiconductor devices and such so far, components are produced by covering fiber bodies formed of carbon fibers or SiC fibers with ceramics. For example, in the field of the aircrafts, ceramic matrix composites (CMCs) are sued for components used in high-temperature parts such as aircraft engines. The ceramic matrix composites are materials that are light-weight and superior in high-temperature strength. The ceramic matrix composites are composite materials in which preforms as fiber bodies are subject to impregnation of ceramics and thereby covered therewith. See Japanese Patent Application Laid-open No. 2001-508388.

SUMMARY

In a case where fiber bodies are subject to impregnation of ceramics and thereby covered therewith, however, this has been executed by a chemical vapor infiltration (CVI) method in which a reaction from a vapor phase that is superior in diffusion of ingredients for the ceramics is used. In the chemical vapor infiltration method, films are grown under extremely low film growth rates with diffusion of the ingredients into fiber bodies. Processes by the chemical vapor infiltration method thus require long duration and are a factor for deteriorating productivity of components or such of the ceramic matrix composites.

The present disclosure is therefore intended for providing a method for covering a fiber body by which the fiber body can be rapidly covered with a ceramic.

A method for covering a fiber body includes an impregnation condition determination process for, at a time of carrying out a chemical vapor infiltration to cover the fiber body with a ceramic, determining an infiltration temperature and an infiltration pressure that maximizes a film growth rate of the ceramic throughout the fiber body relative to the infiltration temperature; and an infiltration step for supplying a film gas including an ingredient of the ceramic to carry out the chemical vapor infiltration at the infiltration temperature and the infiltration pressure determined in the impregnation condition determination process.

DESCRIPTION OF EMBODIMENTS

Figure 1:
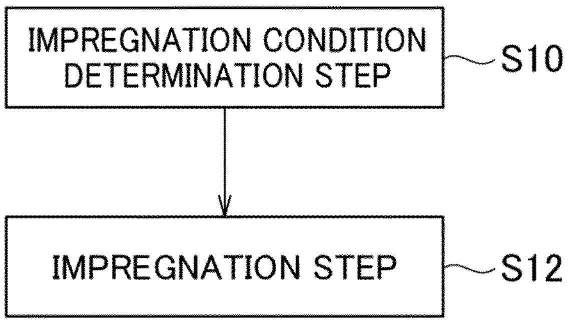
FIG. 1 is a flowchart showing a constitution of a method for covering a fiber body in the embodiment of the present disclosure.

Certain embodiments of the present disclosure will be described hereinafter with reference to the appended drawings. FIG. 1 is a flowchart showing a constitution of a method for covering a fiber body. The method for covering the fiber body is provided with an impregnation condition determination process (S10) and an impregnation process (S12).

The method for covering the fiber body is a method for carrying out chemical infiltration of a ceramic into a fiber body constituted of carbon fibers or Sic fibers. The method for covering the fiber body can be used for example for production of components for an aircraft field or a semiconductor device field. The method for covering the fiber body is for example used for production of a ceramic matrix composite applied to jet engine components or such. In the production of the ceramic matrix composite, it is executed that BN (boron nitride) is chemically infiltrated into fibers of a fiber body or SiC (silicon carbide) is chemically infiltrated into fibers of a fiber body.

Figure 2:
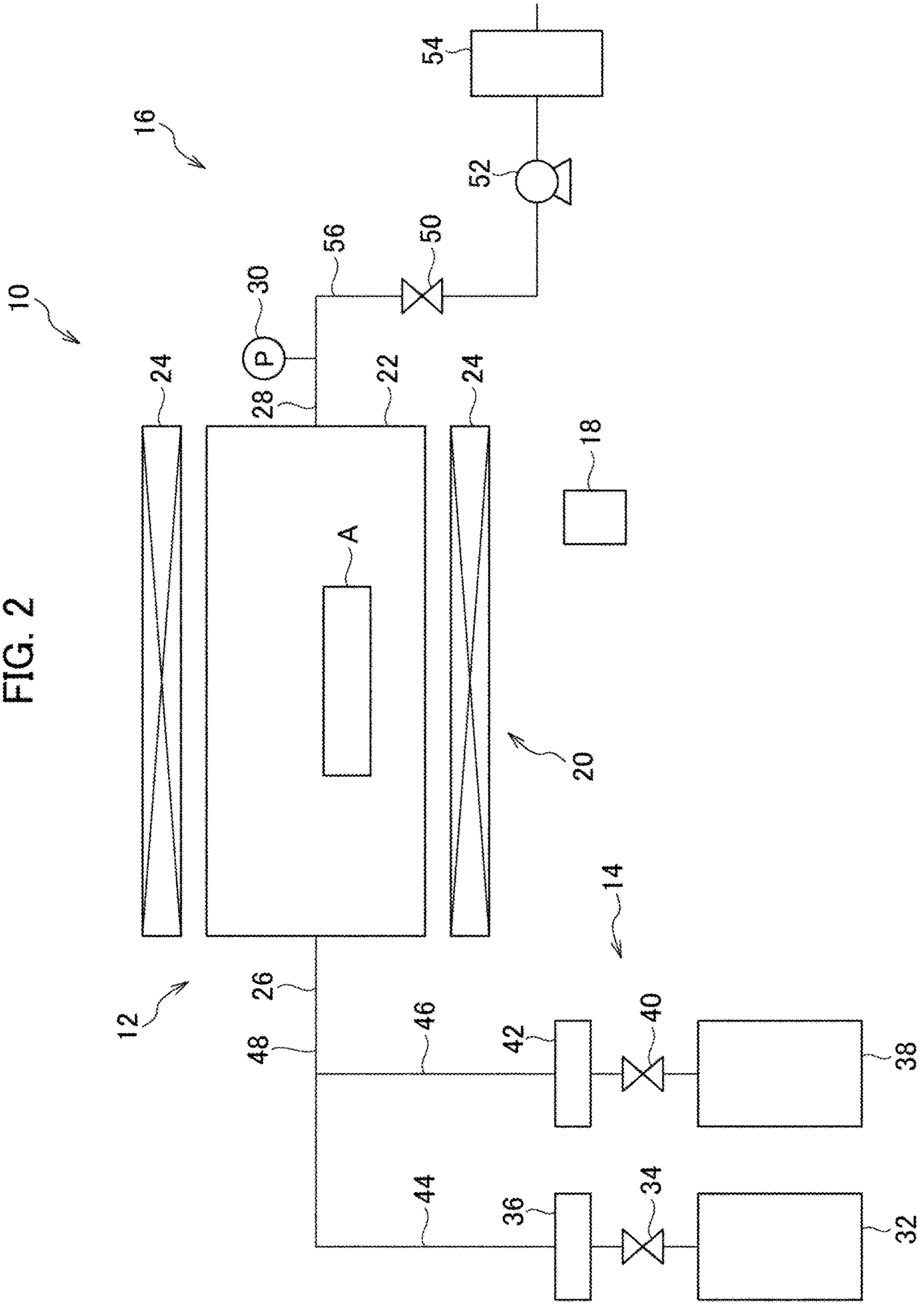
FIG. 2 is a drawing showing a constitution of a device for covering the fiber body in the embodiment of the present disclosure.

First, a device for covering the fiber body used in the method for covering the fiber body will be described. FIG. 2 is a drawing showing a constitution of a covering device 10 for the fiber body. The covering device 10 for the fiber body is constituted of a chemical vapor infiltration device. The covering device 10 for the fiber body is provided with a reaction section 12, a gas feeding section 14, a gas exhaustion section 16 and a control section 18.

The reaction section 12 has a function for infiltrating a ceramic into a fiber body A to execute film growth. The reaction section 12 is provided with a reaction furnace 20. The reaction furnace 20 has a reaction container 22 and a heater 24 provided around the reaction container 22. The reaction furnace 20 may be constituted of a lateral electric furnace such as a hot-wall type.

The reaction container 22 is formed to be cylindrical like a cylinder or such. The reaction container 22 is formed so that the fiber body A is insertable therein. In the reaction container 22, a thermometer (not shown) such as a thermocouple for measuring a temperature in the furnace is provided. The reaction container 22 has a gas introduction port 26 provided at one end side in the lengthwise direction of the reaction container 22 and a gas exhaustion port 28 provided at another end side in the lengthwise direction of the reaction container 22. The gas introduction port 26 side of the reaction container 22 is corresponding to an upstream side of the reaction container 22. The gas exhaustion port 28 side of the reaction container 22 is corresponding to a downstream side of the reaction container 22. In the gas exhaustion port 28, a pressure gauge 30 for measuring a pressure in the furnace is provided.

The gas feeding section 14 has a function for feeding an ingredient for the ceramic and a carrier gas to the reaction container 22. The gas feeding section 14 has an ingredient container 32 for storing the ingredient, a first on-off valve 34, and a first mass flow controller 36. The first on-off valve 34 and the first mass flow controller 36 have a function for regulating a flow rate of the ingredient.

The gas feeding section 14 has a carrier gas container 38 for storing the carrier gas, a second on-off valve 40 and a second mass flow controller 42. The first on-off valve 40 and the first mass flow controller 42 have a function for regulating a flow rate of the carrier gas.

The gas feeding section 14 has a gas tubing 44 for transporting the ingredient and a gas tubing 46 for transporting the carrier gas. The gas feeding section 14 has a gas tubing 48 for transporting a film growth gas containing the ingredient. The film growth gas may include the ingredient and the carrier gas.

The gas exhaustion section 16 has a function for exhausting a gas in the furnace from the reaction container 22. The gas exhaustion section 16 is provided with a third on-off valve 50, an exhaustion pump 52 and a scrubber 54. The third on-off valve 50 has a function for regulating the exhausted gas in the furnace. The exhaustion pump 52 has a function for evacuating the interior of the reaction container 22. The scrubber 54 has a function for recovering reaction by-products or such. The gas exhaustion section 16 has a gas tubing 56 for transporting the exhausted gas in the furnace.

To the exhaustion pump 52, an oil-sealed rotary vacuum pump, a mechanical booster pump, or a water seal vacuum pump is applicable. In a case where the pressure in the reaction container 22 is kept over 50 Torr in total pressure to cover the fiber body A with the ceramic as will be described later, the water seal vacuum pump is preferably used. Because maintenance or such is readily carried out on the water seal vacuum pump as compared with the oil-sealed rotary vacuum pump or the mechanical booster pump.

The control section 18 has a function for controlling the reaction section 12, the gas feeding section 14 and the gas exhaustion section 16. The control section 18 may be constituted of a general computer system.

The control section 18 is capable of controlling the first on-off valve 34 and the first mass flow controller 36 to regulate the flow rate of the ingredient. The control section 18 is capable of controlling the second on-off valve 40 and the second mass flow controller 42 to regulate the flow rate of the carrier gas. The control section 18 is capable of, by regulating the flow rate of the ingredient and the flow rate of the carrier gas, regulating a flow rate ratio between the ingredient and the carrier gas, a partial pressure ratio between the ingredient and the carrier gas in the reaction container 22 or such.

The control section 18 is capable of controlling the heater 24 to regulate the temperature in the reaction container 22. The control section 18 is capable of controlling the third on-off valve 50 and the exhaustion pump 52 to regulate the pressure in the reaction container 22.

Next, the impregnation condition determination process (S10) will be described. The impregnation condition determination process (S10) is a process for, at a time of carrying out a chemical vapor infiltration to cover the fiber body with a ceramic, determining an infiltration temperature and an infiltration pressure that maximizes a film growth rate of the ceramic throughout the fiber body relative to the infiltration temperature.

The impregnation condition determination process (S10) is provided with a fiber body model setting step, an ingredient model setting step, an ingredient diffusion model setting step, a reaction model setting step, an ingredient concentration distribution calculation step, a film growth rate calculation step and an infiltration condition determination step. Each step will be described next.

(Fiber Body Model Setting Step)

Figure 3:
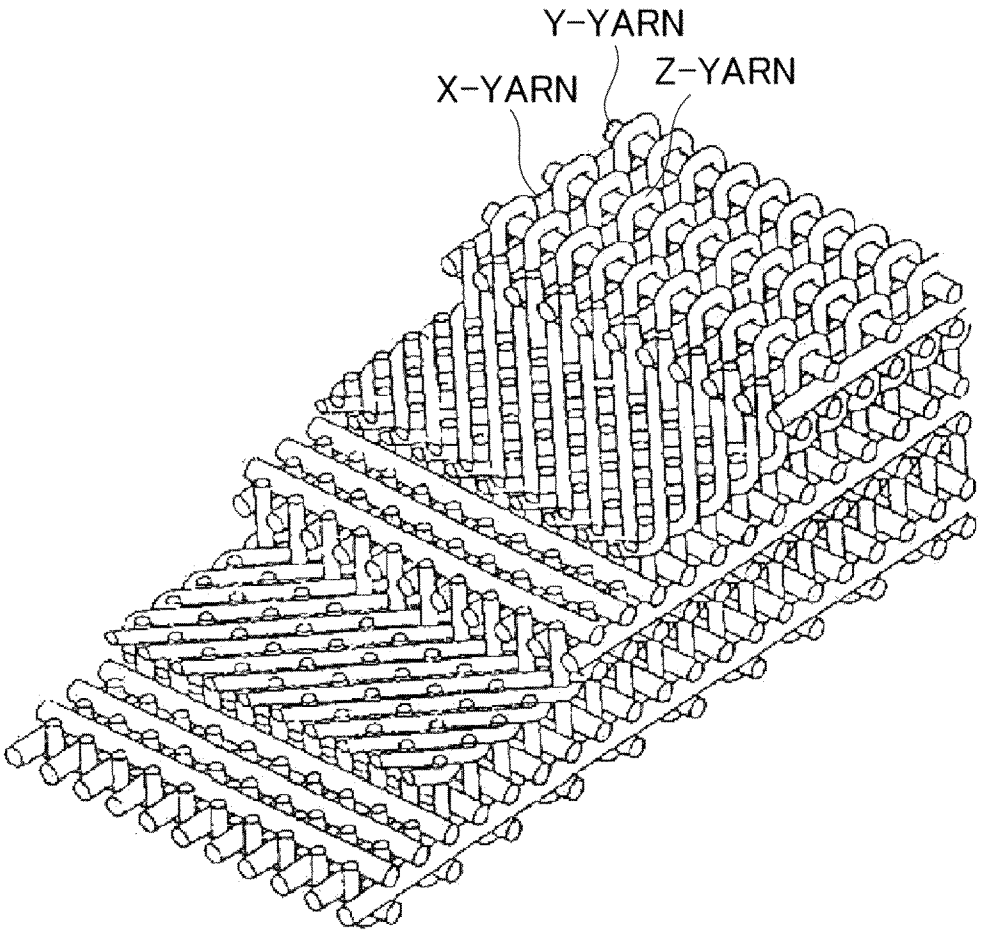
FIG. 3 is a drawing explaining a method for setting a fiber body model in the embodiment of the present disclosure.

The fiber body model setting step is a step for setting a fiber body model about the fiber body to be covered with the ceramic. FIG. 3 is a drawing explaining the method for setting the fiber body model. The fiber body shown in FIG. 3 is constituted of a three-dimensional fabric woven from fiber bundles of X-yarn, Y-yarn and Z-yarn.

The fiber body is woven from and thus constituted of fiber bundles in which hundreds or tens of thousands filaments are bundled together. The fiber body model is thus set as to a shape and dimensions, a form of the fabric, fiber bundles, and fibers in the fiber bundles. In regard to the shape and the dimensions, the thicknesses and such of the fiber body are set. To set the thickness of the fiber body is for consideration only of ingredient diffusion in the thickness direction that give the thinnest width in the fiber body. In the fiber body shown in FIG. 3, the thickness in the direction along the Z-yarns is set. The form of the fabric is set about a two-dimensional fabric, a three-dimensional fabric or such for example. In the fiber body shown in FIG. 3, it is set about the three-dimensional fabric.

As to the fiber bundles, diameters of the fiber bundles and gaps among the fiber bundles are set. In the fiber body shown in FIG. 3, the fiber bundle diameters of the fiber bundles formed of the X-yarns, Y-yarns and Z-yarns, the gaps between the X-yarns and the Y-yarns, the gaps between the X-yarns and the Z-yarns, and the gaps between the Y-yarns and the Z-yarns are set. As to the filaments constituting the fiber bundles formed of the X-yarns, the Y-yarns and the Z-yarns, the filament diameters and the gaps among the filaments are set. In the fiber body shown in FIG. 3, the filament diameters of the filaments contained in the X-yarns and such and the gaps among the filaments contained in the X-yarns and such are set.

Further, to calculate the ingredient concentration distribution in the fiber body in the ingredient concentration calculation step described below, a fiber body unit cell representing the constitution of the fiber body model is set. The fiber body unit cell may be constituted of a rectangular parallelepiped for example. In the fiber body shown in FIG. 3, the fiber body unit cell is so constituted as to contain the X-yarns, the Y-yarns and the Z-yarns.

(Ingredient Model Setting Step)

The ingredient model setting step is a step for setting the ingredient model of the ingredient for the ceramic to cover the fiber body. In a case where the ceramic is of SiC for example, the ingredient model is set as organic chlorosilane or such. The organic chlorosilane is methyltrichlorosilane ($CH_3SiCl_3$: MTS), dimethyldichlorosilane ($(CH_3)_2SiCl_2$: DDS), trimethylchlorosilane ($(CH_3)_3SiCl$: TCS), tetramethylsilane ($(CH_3)_4Si$: TMS) or such. By the way, in the following descriptions, the compound names may be abbreviated. Methyltrichlorosilane for example may be represented as MTS.

Further, in a case where the ceramic is of BN for example, the ingredient model is set to be boron trichloride ($BCl_3$), diboran ($B_2H_6$), decaborane ($B_{10}H_{14}$), trimethylboron ($B(CH_3)_3$), trimethyl borate ($B(OCH_3)_3$) or such.

(Ingredient Diffusion Model Setting Step)

Figure 4A:
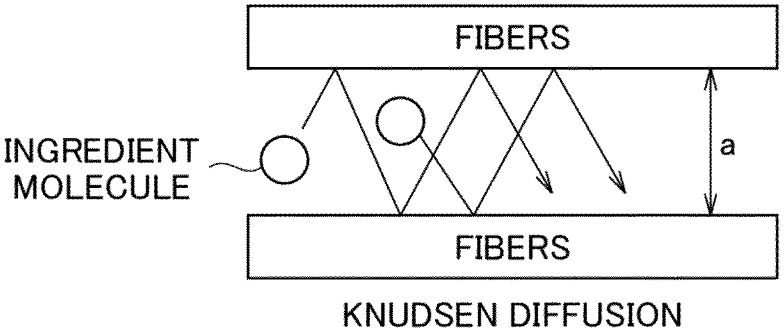
FIGS. 4A and 4B are drawings explaining a method for setting an ingredient diffusion model in the embodiment of the present disclosure.
Figure 4B:
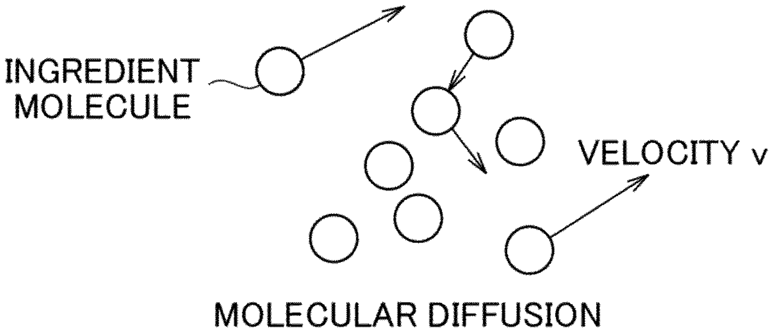

The ingredient diffusion model setting step is a step for setting an ingredient diffusion model at a time of feeding and diffusing an ingredient to the fiber body. FIGS. 4A and 4B are drawings explaining a method for setting an ingredient diffusion model, where FIG. 4A is an explanatory drawing about Knudsen diffusion and FIG. 4B is an explanatory drawing about molecular diffusion.

The ingredient diffusion model is set on the basis of a mean free path of an ingredient molecule. The mean free path λ of the ingredient molecule can be obtained from the formula 1.

$$\lambda = \frac{kT}{\sqrt{2}\pi d^2 P}, \qquad \text{[formula 1]}$$

where d represents a radius of the molecule, k represents the Boltzmann constant, T represents a temperature, and P represents a pressure.

In a case where the mean free path of the ingredient molecule is greater than the gap among the fiber bundles, the ingredient diffusion model is set as the Knudsen diffusion. As shown in FIG. 4A, the Knudsen diffusion is a diffusion model in which the ingredient molecules repeat collisions with walls and then diffuse. The formulae 2 through 3 are formulae for obtaining the Knudsen diffusion constant $D_k$.

$$D_k = \frac{1}{3}va, \qquad \text{[formula 2]}$$

where v represents a mean speed of the molecule, and a represents a gap among the filaments or a gap among the fiber bundles.

$$v = \sqrt{\frac{8RT}{\pi M}}, \qquad \text{[formula 3]}$$

where R represents the gas constant, T represents a temperature, and M represents a molecular weight.

In a case where the mean free path of the ingredient molecule is smaller than the gap among the fiber bundles, the ingredient diffusion model is set as the molecular diffusion. As shown in FIG. 4B, the molecular diffusion is a diffusion model in which the ingredient molecules repeat collisions with each other and then diffuse. By the way, as the gap among the fiber bundles is generally far larger than the mean free path of the ingredient molecule, the molecular diffusion is applied to the ingredient diffusion model in the fiber bundles.

The formulae 4 through 6 are formulae for obtaining the molecular diffusion constant $D_m$. The molecular diffusion constant $D_m$ can be obtained from a diffusion constant $D_{1,2}$ between two bodies in the formula of Chapman-Enskog. T represents a temperature. P represents a pressure. M represents a molecular weight. $\Omega_D$ represents a reduced collision integral. TN represents a standardized temperature. k represents the Boltzmann constant. σ and ε are Lenneard-Jones parameters. These Lenneard-Jones parameters can be obtained from literatures. Table 1 exemplarily represents Lenneard-Jones parameters about $C_2H_2$ (acetylene), $CH_4$ (methane), $H_2$ (hydrogen) and MTS.

$$D_{1,2} = 0.1883 \times 10^{-4} \times \frac{\sqrt{T^3(M_{r,1}+M_{r,2})/M_{r,1}M_{r,2}}}{p\sigma_{1,2}^2\Omega_D} \quad \text{[formula 4]}$$

$$\Omega_D = \frac{1.06036}{T_N^{0.1561}} + \frac{0.19300}{\exp(0.47635T_N)} + \frac{1.03587}{\exp(1.52996T_N)} + \frac{1.76474}{\exp(3.89411T_N)} \quad \text{[formula 5]}$$

$$\sigma_{1,2} = \frac{\sigma_1+\sigma_2}{2} \quad \text{[formula 6]}$$

$$\varepsilon_{1,2}/k = \sqrt{\varepsilon_1/k \times \varepsilon_2/k}$$

$$T_N = kT/\varepsilon$$

TABLE 1

| | δ Å | ε/K K |
|---|---|---|
| $C_2H_2$ | 4.033 Å | 231.8K |
| $CH_4$ | 3.8 Å | 148.1K |
| $H_2$ | 2.915 Å | 38K |
| MTS | 5.913 Å | 398K |

Figure 5:
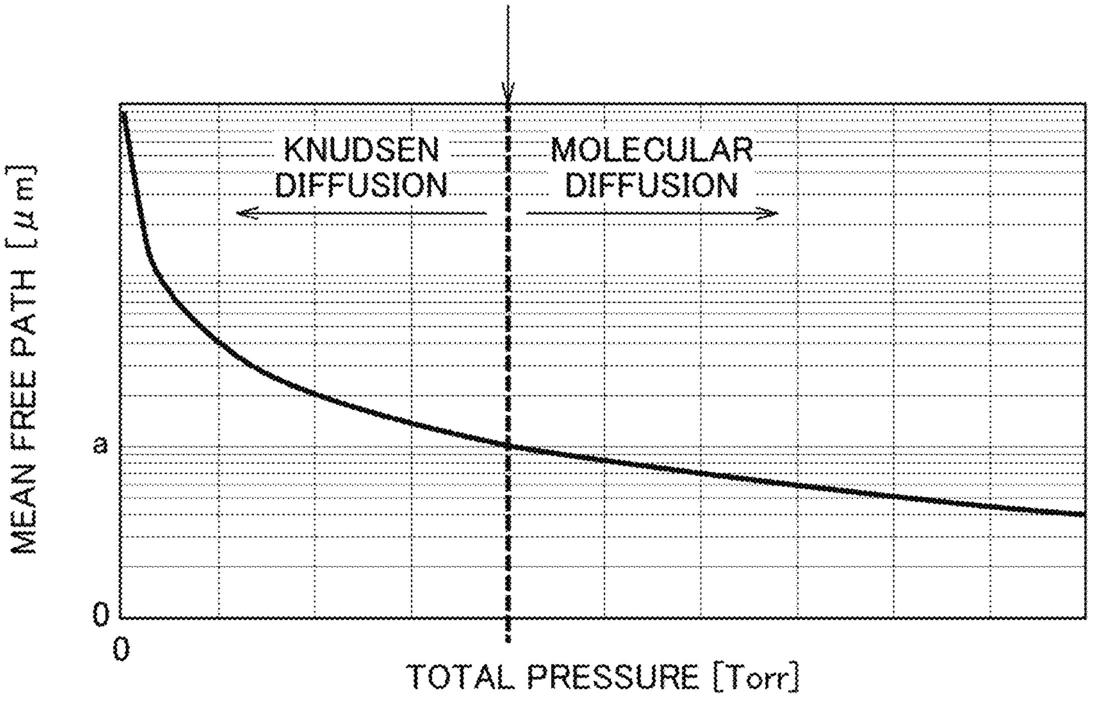
FIG. 5 is a drawing explaining a transient process between Knudsen diffusion and molecular diffusion in the embodiment of the present disclosure.

FIG. 5 is a drawing explaining a transient process between Knudsen diffusion and molecular diffusion. In FIG. 5, a pressure is put on the horizontal axis and a mean free path is put on the vertical axis to show the mean free path of the ingredient molecule. The arrow in FIG. 5 represents a transient area between Knudsen diffusion and molecular diffusion.

Figure 13:
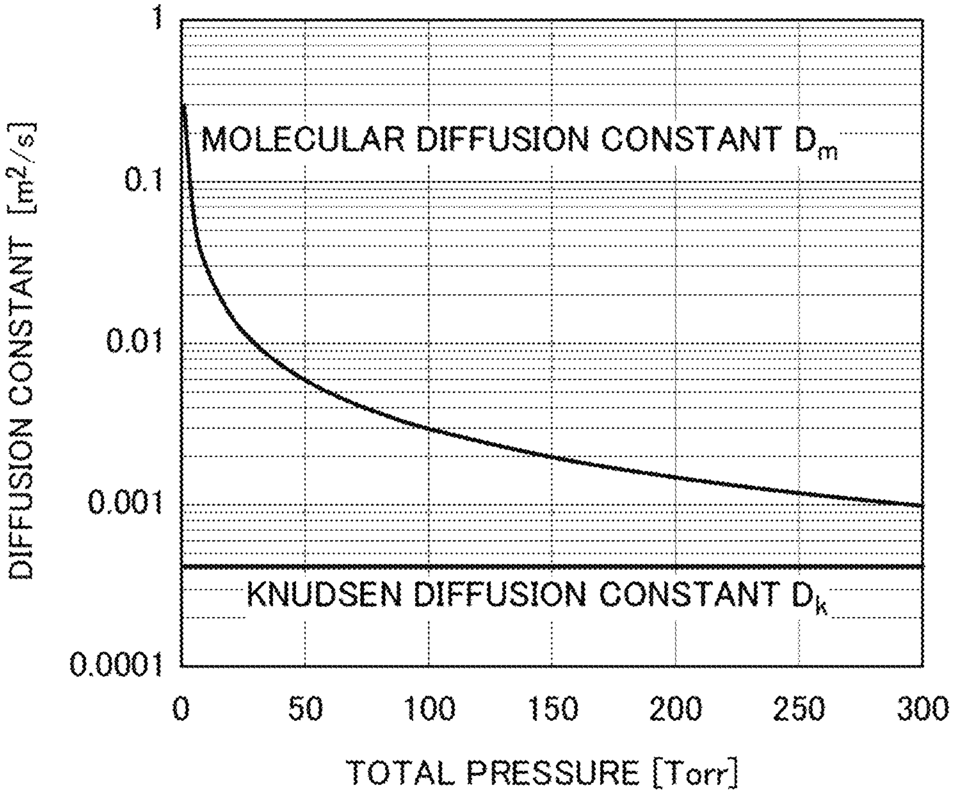
FIG. 13 is a graph showing a Knudsen diffusion constant $D_k$, and a molecular diffusion constant $D_m$ at 950 degrees C. and at from 0 Torr to 300 Torr in total pressure in the embodiment of the present disclosure.

When the mean free path of the ingredient molecule is equal to a gap a among the filaments is the transient area between Knudsen diffusion and molecular diffusion. In a case where the mean free path of the ingredient molecule is larger than the gap a among the filaments, the diffusion of the ingredient molecule becomes Knudsen diffusion. In a case where the mean free path of the ingredient molecule is smaller than the gap a among the filaments, the diffusion of the ingredient molecule becomes molecular diffusion. By the way, the Knudsen diffusion is two or more orders of magnitude smaller than the molecular diffusion. The fact that the Knudsen diffusion is two or more orders of magnitude smaller than the molecular diffusion is also shown by the graph of FIG. 13 that explains the diffusion constant of MTS described later.

(Reaction Model Setting Step)

The reaction model setting step is a step for setting the reaction model at a time of film growth of the ceramic from the ingredient diffusing in the fiber body. The reaction model is set on the basis of film species and sticking probabilities of the film species. And, a surface reaction rate constant $k_s$ is calculated from the film species and the sticking probabilities of the film species. The surface reaction rate constant $k_s$ is a reaction rate constant per unit area.

The film species are chemical species contributive to film growth of the ceramic. The ingredient diffusing in the fiber body becomes the film species and thus contributes to the film growth of the ceramic. The film species may be for example the same substance as the ingredient or any intermediate product created by thermal decomposition reaction of the ingredient or reaction or such with any other substance. The number of the film species are not limited and may be one, or two or more. In a case where two or more kinds of the film species exist, contribution rates by which each film species contributes to the film growth may be set. The contribution rate means a ratio of contribution of each film species to the film growth. The contribution rates of the film species may be even or different.

The sticking probability of the film species is a probability of conversion of the film species reacted on a surface of a filament into the ceramic. In a case where a plurality of kinds of film species exist, the plurality of kinds of film species independently form the film according to the respective sticking probabilities and the respective contribution rates. The film made by the film growth may be the sum of the film growths by the respective film species.

The film species, the contribution rates of the film species, and the sticking probabilities of the film species may be set by any experimentations and analyses or reference to literatures or such. The film species, the contribution rates of the film species, and the sticking probabilities of the film species may be obtained by a micro cavity method or a multi-scale analysis using known trench substrates for example. Analyses using the trench substrates are described in the pamphlet of WO 2015/129772 for example.

The surface reaction rate constant $k_s$ is calculated on the basis of the film species and the sticking probability. The formula 7 is a formula for obtaining the surface reaction rate constant $k_s$.

$$k_S = \frac{1}{4}v\eta, \quad \text{[formula 7]}$$

where η is a sticking probability as a dimensionless number, and v is a mean speed of a molecule, which can be obtained from the formula 3. The coefficient of ¼ means an integral in which the film species are incoming from random directions are considered.

(Ingredient Concentration Distribution Calculation Step)

The ingredient concentration distribution calculation step is a step for calculating the concentration distribution of the ingredient diffusing in the fiber body. To evaluate ingredient diffusion, for the purpose of simplification of the phenomena, only the ingredient diffusion in the thickness direction as the thinnest width in the fiber body may be considered. The ingredient concentration distribution in the thickness direction of the fiber body can be obtained from the formulae 8 and 9.

$$\frac{C_x}{C_0} = \frac{\cosh\left(\Phi + \frac{x}{L}\right)}{\cosh\Phi} \quad \text{[formula 8]}$$

$$\Phi = L\sqrt{\frac{k_v}{D}} \quad \text{[formula 9]}$$

The ingredient concentration distribution in the thickness direction of the fiber body can be obtained by the relative ingredient concentration $C_x/C_0$. The relative ingredient concentration $C_x/C_0$ is a ratio of the ingredient concentration $C_x$ in the fiber body at a depth x in the thickness direction from its surface to the ingredient concentration $C_0$ in the fiber body at the surface in the thickness direction. D represents a diffusion constant of the ingredient. $k_v$ represents a reaction rate constant per unit volume. x represents a depth in the thickness direction from the surface of the fiber body. L represents a thickness of the fiber body.

While, in the formula 8, $\phi$ in the formula 9 is contained, it is a Thiele modulus. The Thiele modulus is a dimensionless number. The Thiele modulus indicates that the relative ingredient concentration $C_x/C_0$ is determined by a balance between the diffusion constant D of the ingredient and the reaction rate constant $k_v$ per unit volume.

More particularly, the diffusion constant D of the ingredient relates to a ratio of the ingredient reaching the interior of the fiber body by the ingredient diffusion. The reaction rate constant $k_v$ per unit volume relates to a rate of the ingredient consumed by the film growth of the ceramic generated at the surface of the fiber body. The relative ingredient concentration $C_x/C_0$ is thus determined by the balance between the ratio of the ingredient reaching the interior of the fiber body by the ingredient diffusion and the rate of the ingredient consumed by the film growth of the ceramic generated at the surface of the fiber body.

How to obtain the diffusion constant D of the ingredient will be described hereafter. The diffusion constant D of the ingredient can be obtained from the ingredient diffusion model set in the ingredient diffusion model setting step. The description will be first directed to a case where ingredient diffusion model is set as the Knudsen diffusion in between the filaments in the fiber bundles but is as the molecular diffusion in between the fiber bundles. As the Knudsen diffusion constant is two or more orders of magnitude larger than the molecular diffusion constant, the speed at which the ingredient reaches into the fiber body by the ingredient diffusion becomes far lower in between the filaments in the fiber bundles than in between the fiber bundles. Thus when the ingredient concentration distribution is to be obtained, the ingredient diffusion in between the filaments in the fiber bundles is not needed to be considered. The molecular diffusion constant $D_m$ is therefore, as the molecular diffusion in between the fiber bundles is taken into consideration, applied to the diffusion constant D of the ingredient.

The description will be next directed to a case where ingredient diffusion model is set as the molecular diffusion both in between the filaments in the fiber bundles and in between the fiber bundles. The speed at which the ingredient reaches into the fiber body becomes higher in between the filaments in the fiber bundles as in between the fiber bundles. The molecular diffusion constant $D_m$ is therefore, as the molecular diffusion in between the fiber bundles and also in between the fiber bundles is taken into consideration, applied to the diffusion constant D of the ingredient.

As seen above, even whether the ingredient diffusion model in between the filaments in the fiber bundles is set as the molecular diffusion or the ingredient diffusion model in between the filaments in the fiber bundles is set as the Knudsen diffusion, the molecular diffusion constant $D_m$ is applied to the diffusion constant D of the ingredient.

How to obtain the reaction rate constant $k_v$ per unit volume will be next described. The reaction rate constant $k_v$ per unit volume can be obtained on the basis of the surface reaction rate constant $k_s$ obtained in the reaction model setting step. The reaction rate constant $k_v$ per unit volume can be obtained from the formula 10 with using the surface reaction rate constant $k_s$.

$$k_v = \frac{S}{V} k_s, \qquad \text{[formula 10]}$$

where the area S represents a surface area of surfaces of the filaments on which the ceramic in the fiber body grows, and the volume V is a spatial volume of the fiber body which does not include that of the filaments.

Figure 6:
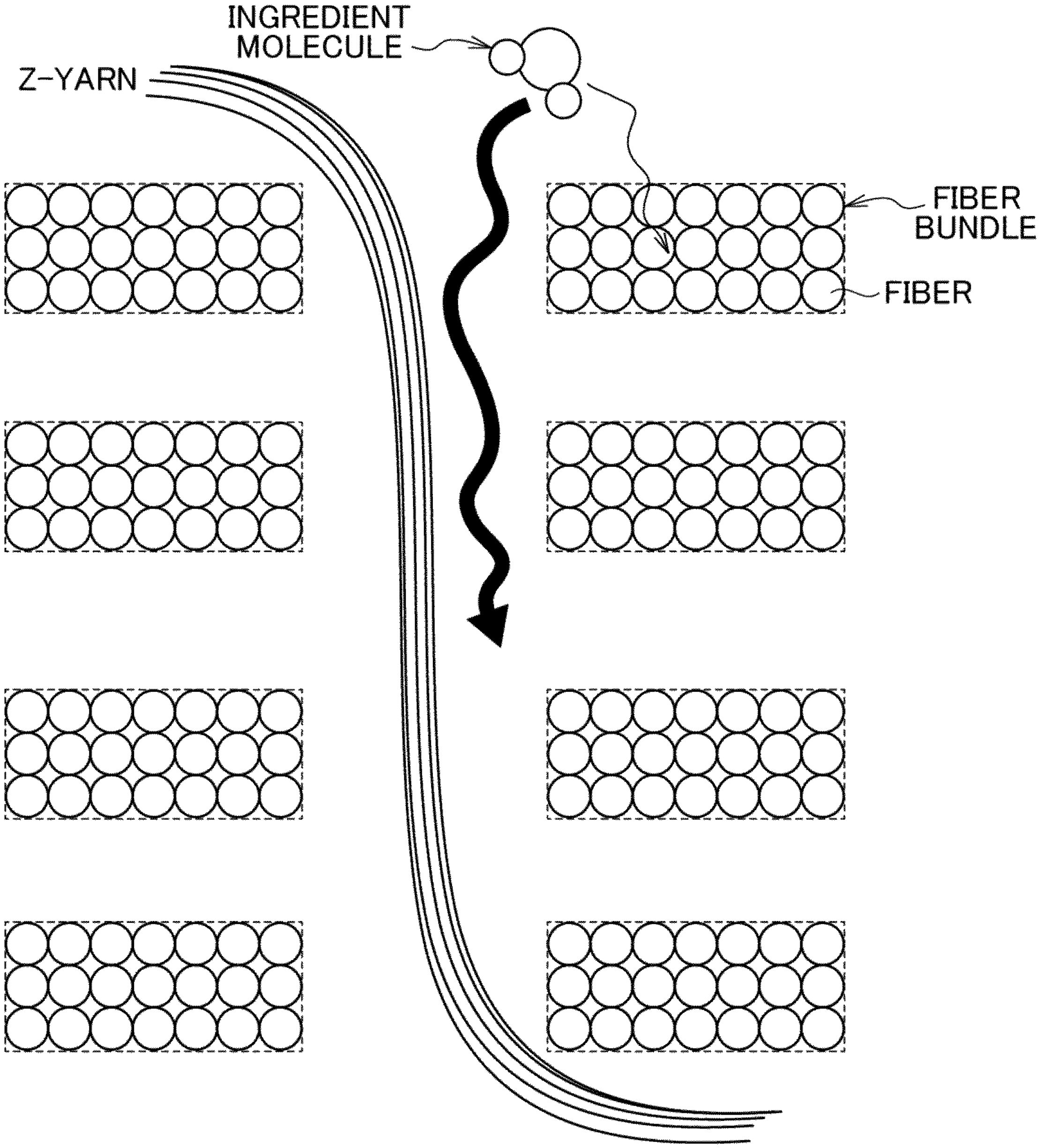
FIG. 6 is a drawing explaining a way of obtaining an area S and a volume V in the embodiment of the present disclosure.

How to obtain the area S and the volume V will be next described. FIG. 6 is a drawing explaining a way of obtaining the area S and the volume V. By the way, the area S and the volume V are calculated from the fiber body unit cell set in the fiber body model setting step. The fiber body unit cell is, as described above, representative of the constitution of the fiber body.

The description will be first directed to a case where the ingredient diffusion model is set as the Knudsen diffusion in between the filaments in the fiber bundles and set as the molecular diffusion in between the fiber bundles. As the Knudsen diffusion constant is two or more orders of magnitude smaller than the molecular diffusion constant in this case, the surface reaction on peripheral surfaces of the fiber bundles is more dominant than the surface reaction on the filaments in the fiber bundles. The consumption of the ingredient by the film growth on the peripheral surfaces of the fiber bundles becomes far larger than the consumption of the ingredient by the film growth on the filaments in the fiber bundles.

Thus, to obtain the ingredient concentration distribution, as it is not necessary to consider the consumption of the ingredient by the surface reaction on the filaments in the fiber bundles, the surface area of the respective filaments in the fiber bundles is negligible. The area S is therefore the sum of the surface areas of the peripheral surfaces of the fiber bundles contained in the fiber body. The volume V is the spatial volume of the fiber body from which the filaments of all the fiber bundles are excluded.

The description will be next directed to a case where the ingredient diffusion model is set as the molecular diffusion both in between the filaments in the fiber bundles and in between the fiber bundles. In this case, the molecular diffusion of the ingredient occurs both in between the filaments in the fiber bundles and in between the fiber bundles. Thus, as it is not necessary to consider consumption of the ingredient by the surface reaction on the filaments in the fiber bundles when obtaining the ingredient concentration distribution, the surface area of the respective filaments in the fiber bundle is negligible. The area S is therefore a summed-up area of the surface areas of the peripheral surfaces of the fiber bundles contained in the fiber body. The volume V is a spatial volume of the fiber body from which the filaments of all the fiber bundles are excluded.

And, the calculated diffusion constant D of the ingredient and the calculated reaction rate constant $k_v$ per unit volume are assigned to the formulae 8 and 9 to calculate the relative ingredient concentration $C_x/C_0$ in the fiber body. By the way, in a case where the ingredient diffusion model in between the filaments in the fiber body falls in a transient area between the Knudsen diffusion and the molecular diffusion, it is calculated by averaging the relative ingredient concentration $C_x/C_0$ calculated on the premise that the ingredient diffusion model in between the filaments in the fiber bundles is the Knudsen diffusion and the relative ingredient concentration $C_x/C_0$ calculated on the premise that the ingredient diffusion model in between the filaments in the fiber bundles is the molecular diffusion.

The relative ingredient concentration $C_x/C_0$ in the fiber body is calculated by changing the infiltration pressure relative to the infiltration temperature. The infiltration temperature can be set to be either a thermal decomposition temperature or a reaction temperature with any other substance, or any. The infiltration temperature is on a single condition or a plurality of conditions. The infiltration pressure may be 760 Torr or lower in total pressure for example but not limited thereto. The partial pressure ratio of the ingredient to the carrier gas contained in the film growth gas may be 1:1 for example but not limited thereto.

The relative ingredient concentration $C_x/C_0$ in the fiber body is calculated from the surface of the fiber body to the central portion of the fiber body. The reason is that the ingredient diffuses not only from the surface in the thickness direction of the fiber body but also from the rear surface in the thickness direction of the fiber body. The ways of ingredient diffusion from the surface and from the rear surface in the thickness direction can be considered substantially equal.

Figure 7:
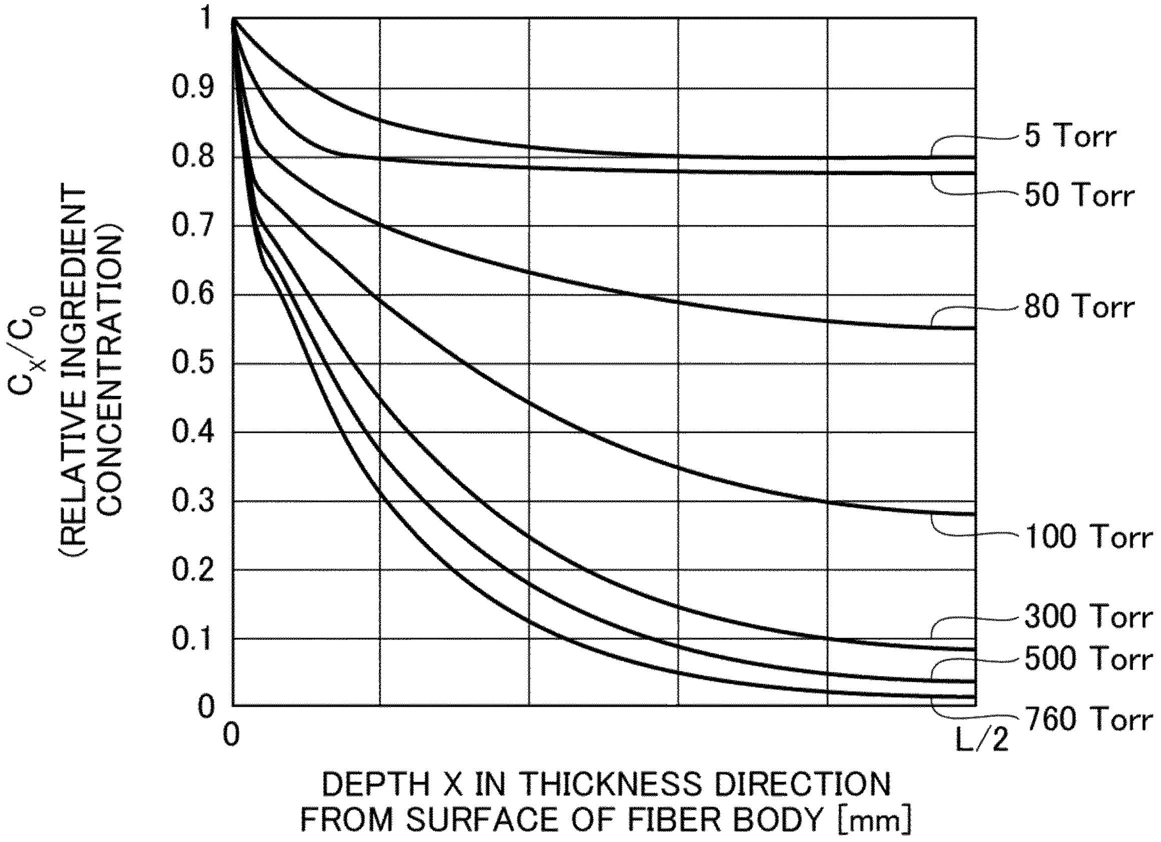
FIG. 7 is a schematic drawing showing an ingredient concentration distribution in the fiber body in the embodiment of the present disclosure.

FIG. 7 is a schematic drawing showing an ingredient concentration distribution in the fiber body. In the graph of FIG. 7, a depth x in the thickness direction from a surface of the fiber body is put on the horizontal axis and a relative ingredient concentration $C_x/C_0$ is put on the vertical axis to show a relation between the depth x in the thickness direction from the surface of the fiber body and the relative ingredient concentration $C_x/C_0$. A relative ingredient concentration $C_x/C_0$ in the fiber body is schematically shown in FIG. 7 as an example when the infiltration pressure relative to the infiltration temperature is changed in a range of 760 Torr or lower in total pressure. A graph as in FIG. 7 for every infiltration temperature may be drawn in a case where not a single condition but a plurality of conditions exists.

As shown in FIG. 7, the relative ingredient concentration $C_x/C_0$ decreases as the depth x in the thickness direction from the surface of the fiber body becomes larger. The degree of decrease of the relative ingredient concentration $C_x/C_0$ becomes smaller as the infiltration pressure is smaller but becomes greater as the infiltration pressure is larger. In FIG. 7, at the center in the thickness direction of the fiber body, the degree of decrease of the relative ingredient concentration $C_x/C_0$ is the smallest at the pressure of 5 Torr in total pressure, and the degree of decrease of the relative ingredient concentration $C_x/C_0$ is the largest at the pressure of 760 Torr in total pressure. On the other hand, in regard to the amount of fed ingredient, the more the ingredient is fed, the higher the infiltration pressure is. The less the ingredient is fed, the lower the infiltration pressure is. Therefore the ingredient concentration $C_x$ at the depth x in the thickness direction from the surface of the fiber body can be determined by balancing the fed amount of the ingredient to the interior of the fiber body and the degree of decrease of the relative ingredient concentration $C_x/C_0$.

(Film Growth Rate Calculation Step)

The film growth rate calculation step is a step for calculating the film growth rate of the ceramic throughout the fiber body. A film growth rate of the ceramic at the depth x in the thickness direction from the surface of the fiber body is first calculated. The film growth rate Rx at the depth x in the thickness direction from the surface of the fiber body can be obtained from a formula shown as the formula 11 on the basis of the surface reaction rate constant $k_s$ and the ingredient concentration $C_x$ at the depth x in the thickness direction from the surface of the fiber body. The reaction of the ingredient is here supposed to follow a first-order reaction. The first-order reaction is a form of reaction in which the reaction rate is proportional to the concentration of the ingredient. The surface reaction rate constant $k_s$ can be calculated from the formula 7. The ingredient concentration $C_x$ at the depth x in the thickness direction from the surface of the fiber body can be calculated from the formulae 8 and 9. The ingredient concentration C0 at the surface in the thickness direction of the fiber body may be obtained from vapor phase composition analysis by a quadrupole mass analyzer or such, or obtained from any analysis.

$$R_x = k_s C_x = \frac{1}{4} v \eta C_x \quad \text{[formula 11]}$$

The film growth rate of the ceramic throughout the fiber body will be next calculated. The film growth rate throughout the fiber body is calculated by integrating the film growth rate Rx of the ceramic at the depth x in the thickness direction from the surface of the fiber body over the thickness direction of the fiber body. In more detail, the film growth rate of the ceramic throughout the fiber body may be obtained by integrating the film growth rate Rx of the ceramic at the depth x in the thickness direction from the surface of the fiber body from 0 to L/2 in the thickness direction of the fiber body and then doubling the result.

Figure 8:
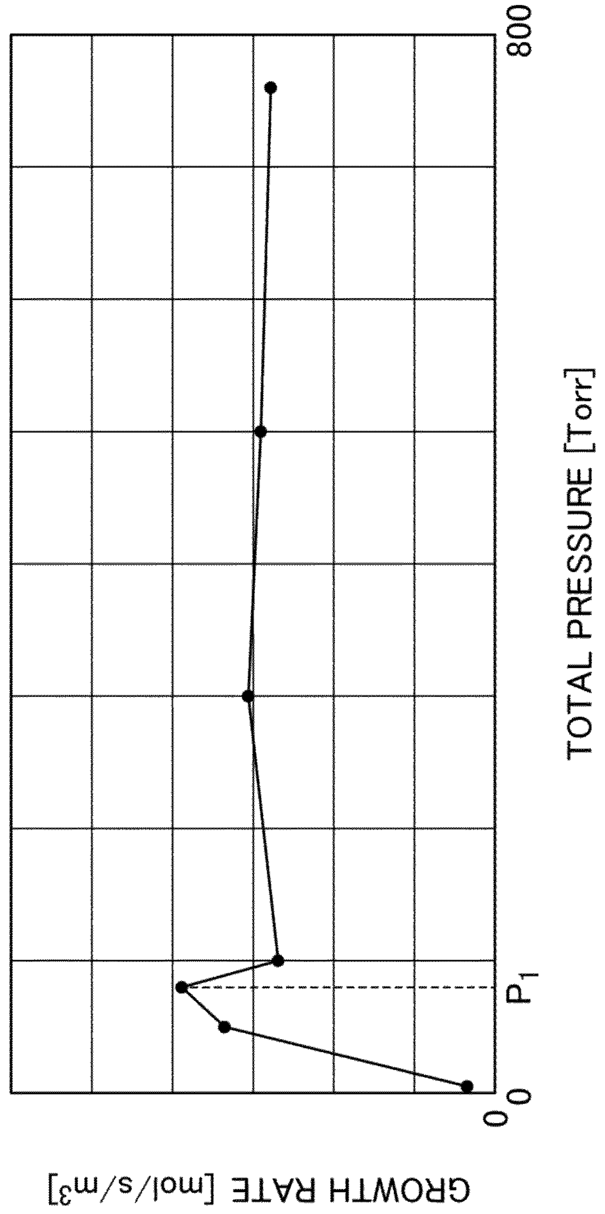
FIG. 8 is a schematic drawing showing a film growth rate of a ceramic throughout the fiber body in the embodiment of the present disclosure.

FIG. 8 is a schematic drawing showing the film growth rate of the ceramic throughout the fiber body. In the graph of FIG. 8, the infiltration pressure is put on the horizontal axis and the film growth rate is put on the vertical axis to schematically show a relation between the infiltration pressure relative to the infiltration temperature and the film growth rate. The graph of FIG. 8 shows that the film growth rate of the ceramic throughout the fiber body becomes maximum at the infiltration pressure P1. By the way, a graph as in FIG. 8 for every infiltration temperature may be drawn in a case where not a single condition but a plurality of conditions exists.

(Infiltration Condition Determination Step)

The infiltration condition determination step is a step for determining an infiltration temperature and an infiltration pressure at which the film growth rate of the ceramic throughout the fiber body relative to the infiltration temperature becomes maximum. The infiltration temperature is determined on the basis of the thermal decomposition temperature of the ingredient and the reaction temperature with any other substance or such. In regard to the infiltration pressure, on the basis of the graph of FIG. 8, the infiltration pressure at which the film growth rate of the ceramic throughout the fiber body relative to the infiltration temperature becomes maximum is determined. In the infiltration pressure at which the film growth rate of the ceramic throughout the fiber body relative to the infiltration temperature becomes maximum, not only the infiltration pressure at which the film growth rate of the ceramic throughout the fiber body becomes maximum but also the infiltration pressure therearound may be contained. In the graph of FIG. 8, not only the infiltration pressure $P_1$ at which the film growth rate of the ceramic throughout the fiber body becomes maximum but also the infiltration pressure around the infiltration pressure $P_1$ may be contained.

Further, in the infiltration condition determination step, the infiltration temperature and the infiltration pressure at which the film growth rate of the ceramic throughout the fiber body becomes maximum may be determined. In more detail, in a case where a plurality of conditions exists in regard to the infiltration temperature exists, the infiltration temperature and the infiltration pressure at which the film growth rate of the ceramic throughout the fiber body becomes maximum may be determined. In the infiltration temperature and the infiltration pressure at which the film growth rate of the ceramic throughout the fiber body becomes maximum, not only the infiltration temperature and the infiltration pressure at which the film growth rate of the ceramic throughout the fiber body becomes maximum but also the infiltration temperature and the infiltration pressure therearound may be contained. The impregnation condition can be thus determined.

The impregnation process (S12) will be next described with using the covering device 10 for the fiber body shown in FIG. 1. The impregnation process (S12) is a process where the film growth gas including the ingredient of the ceramic is fed to the fiber body A to carry out the chemical vapor infiltration at the infiltration temperature and the infiltration pressure determined in the impregnation condition determination process (S10).

First, the fiber body A is set in the reaction container 22 of the reaction furnace 20. The interior of the reaction container 22 is evacuated by means of the exhaustion pump 52. The film growth gas including the ingredient and the carrier gas is fed through the gas feeding section 14 to the reaction container 22. The control section 18 controls the first on-off valve 34, the second on-off valve 40 and the exhaustion pump 52 to regulate the pressure in the reaction container 22 to be the infiltration pressure determined in the impregnation condition determination process (S10). The control section 18 controls the heater 24 to regulate the temperature in the reaction container 22 to be the infiltration temperature determined in the impregnation condition determination process (S10).

The ingredient diffusing in the fiber body A, in this way, thermally decomposes to cover the fiber body A with the ceramic. In more detail, as the ingredient diffuses into the fiber bundles in the fiber body A and into the filaments in the fiber bundles in parallel, the ceramic chemically infiltrates into the fiber bundles and into the filaments in the fiber bundles in parallel to cover them. As the infiltration pressure is set to be the infiltration pressure at which the film growth rate of the ceramic becomes maximum relative to the infiltration temperature, it is enabled to make the ceramic rapidly infiltrate into the fiber body A.

The production method of the ceramic matrix composite will be described next as a concrete example of the method of covering the fiber body. The ceramic matrix composite is supposed to be a SiC/SiC ceramic matrix composite in which SiC is applied to both the fiber body and the matrix. In particular, the following description is directed to a case where, in regard to the SiC/SiC ceramic matrix composite, the fiber body is covered with SiC to form its SiC matrix.

In the impregnation condition determination process (S10), the infiltration temperature and the infiltration pressure at which the film growth rate of SiC throughout the fiber body becomes maximum relative to the infiltration temperature are determined when the chemical vapor infiltration is carried out to cover the fiber body with SiC. The impregnation condition determination process (S10) is, as described above, provided with the fiber body model setting step, the ingredient model setting step, the ingredient diffusion setting step, the reaction model setting step, the ingredient concentration calculation step, the film growth rate calculation step, and the infiltration condition determination step. Each step will be next described.

(Fiber Body Model Setting Step)

Figure 9A:
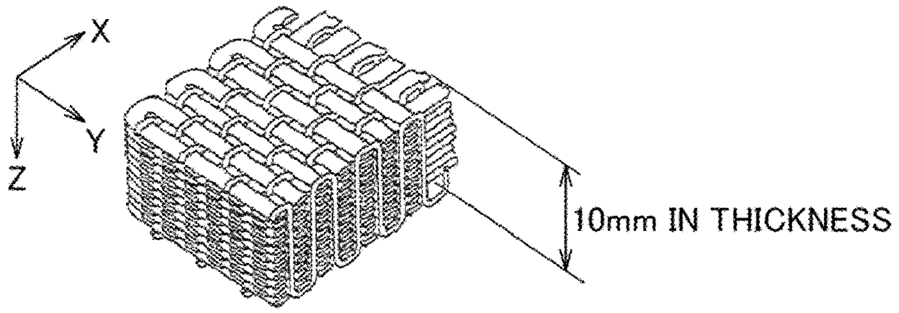
FIGS. 9A through 9D are drawings explaining a setting method for a fiber body model in the embodiment of the present disclosure.
Figure 9B:
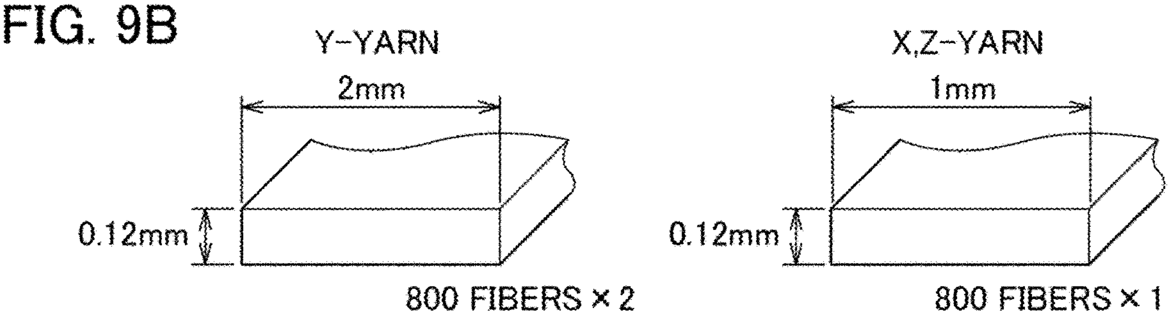
Figure 9C:
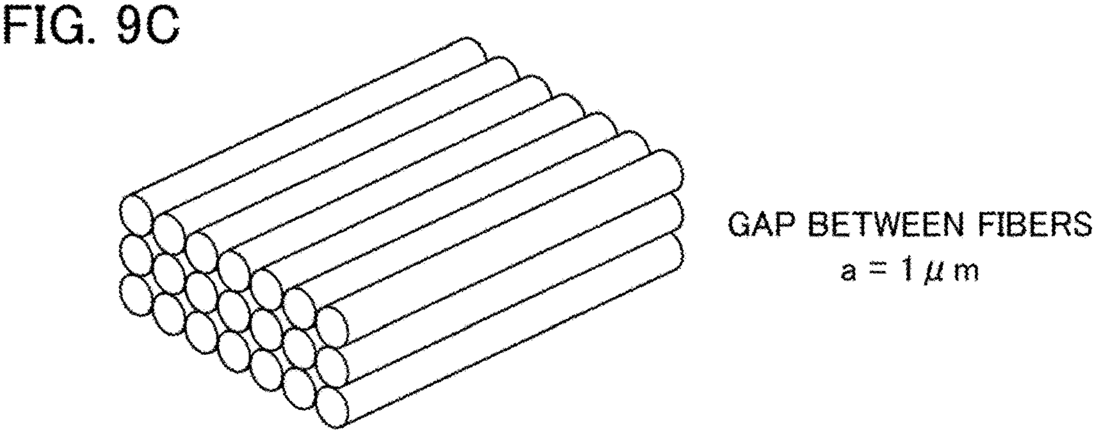
Figure 9D:
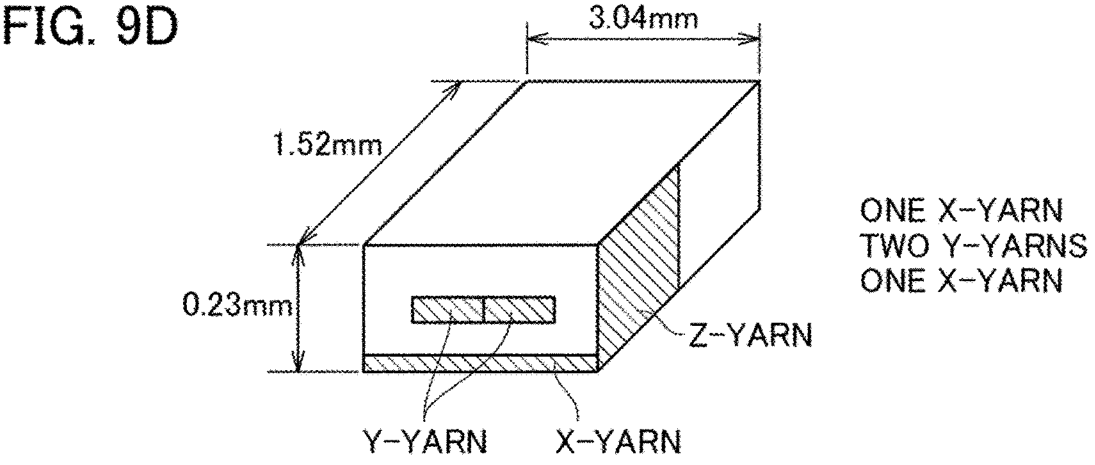

In the fiber body model setting step, the fiber body model about the fiber body to be covered with SiC is determined. FIGS. 9A through 9D are drawings explaining a setting method for a fiber body model. FIG. 9A shows a total constitution of the fiber body. FIG. 9B shows a constitution of the X-yarn, the Y-yarn and the Z-yarn. FIG. 9C shows a constitution of filaments in the X-yarn, the Y-yarn and the Z-yarn. FIG. 9D shows a constitution of a fiber body unit cell.

As shown in FIG. 9A, the fiber body is supposed to be a three-dimensional fabric woven from fiber bundles of the X-yarns, the Y-yarns and the Z-yarns. The X-yarns, the Y-yarns and the Z-yarns are constituted of fiber bundles in which filaments are bundled together. The X-yarns and the Y-yarns are woven in the in-plane direction of the three-dimensional fabric. The Z-yarns are woven in the thickness direction of the three-dimensional fabric. The thickness of the fiber body is supposed to be 10 mm.

As shown in FIG. 9B, each of the X-yarn, the Y-yarn and the Z-yarn is supposed to be a fiber bundle in which 800 filaments are bundled. Each cross sectional shape of the X-yarn, the Y-yarn and the Z-yarn is supposed to be rectangular. Each of the X-yarn and the Z-yarn is constituted of one bundle. The Y-yarn is constituted of two bundles. The cross sectional dimensions of one X-yarn and one Z-yarn are 0.12 mm vertical by 1 mm wide. The cross sectional dimensions of two Y-yarns are 0.12 mm vertical by 2 mm wide.

In regard to the filaments contained in the X-yarn, the Y-yarn and the Z-yarn, the filament diameter is supposed to be 5 μm and the center-to-center diameter is supposed to be 11 μm. As shown in FIG. 9C, the gap among the filaments in the fiber bundles formed of the X-yarn, the Y-yarn and the Z-yarn is supposed to be 1 μm.

As shown in FIG. 9D, a fiber body unit cell representing the filament body is set. The shape of the fiber body unit is supposed to be a rectangular parallelepiped. The fiber body unit cell is so constituted as to contain the one X-yarn, the two Y-yarns and the one Z-yarn. The dimensions of the fiber body unit cell are supposed to be 1.52 mm long by 3.04 mm wide by 0.23 mm high.

(Ingredient Model Setting Step)

In the ingredient model setting step, the ingredient model is set for the ingredient for the SiC covering the fiber body. The ingredient model is supposed to be methyltrichlorosilane ($CH_3SiCl_3$: MTS).

(Ingredient Diffusion Model Setting Step)

In the ingredient diffusion model setting step, the ingredient diffusion model when the MTS as the ingredient is fed to the fiber body is set. The mean free path of MTS is calculated by using the formula 1. The molecular radius d is supposed to be 1.45 angstrom that is a molecular radius of MTS. The Boltzmann constant k is supposed to be $1.38\times10^{-23}$ J/K. The temperature T is supposed to be from 800 degrees C. to 1050 degrees C. as the thermal decomposition temperature of MTS is considered. The pressure P is supposed to be from 0 Torr to 800 Torr in total pressure.

Figure 10:
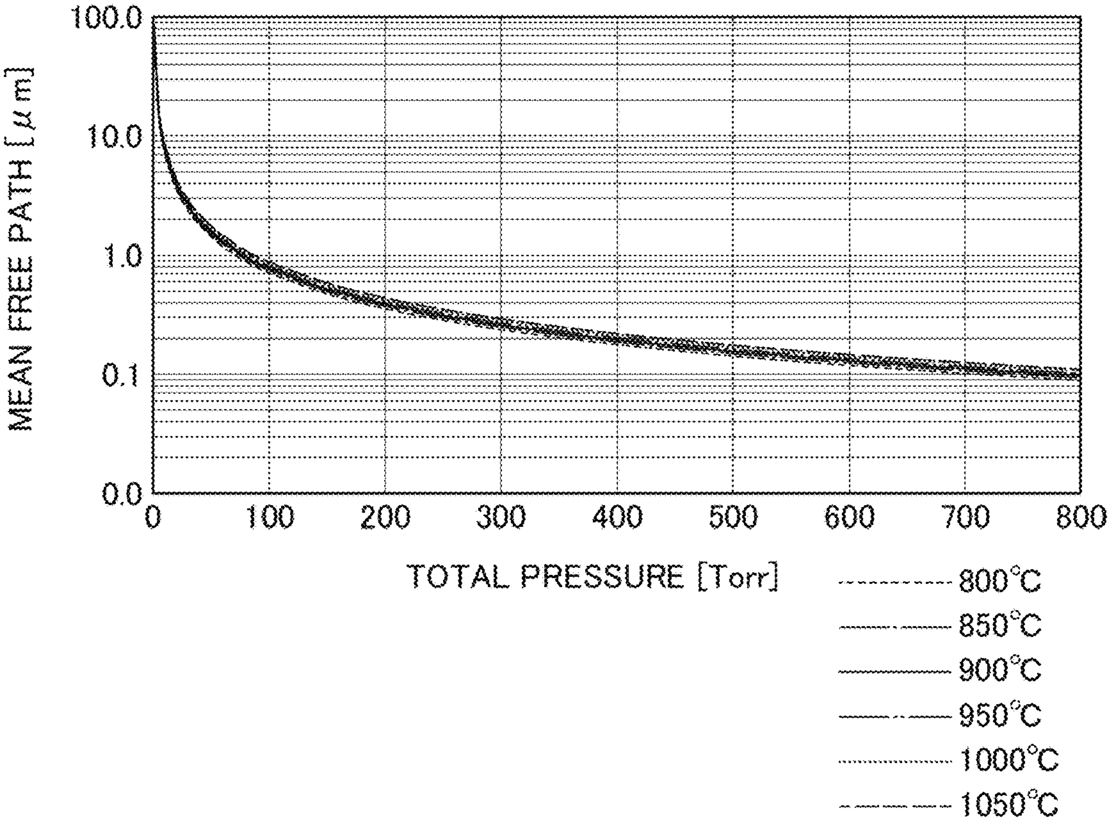
FIG. 10 is a graph showing a mean free path of MTS from 800 degrees C. to 1050 degrees C. and at from 0 Torr to 800 Torr in total pressure in the embodiment of the present disclosure.
Figure 11:
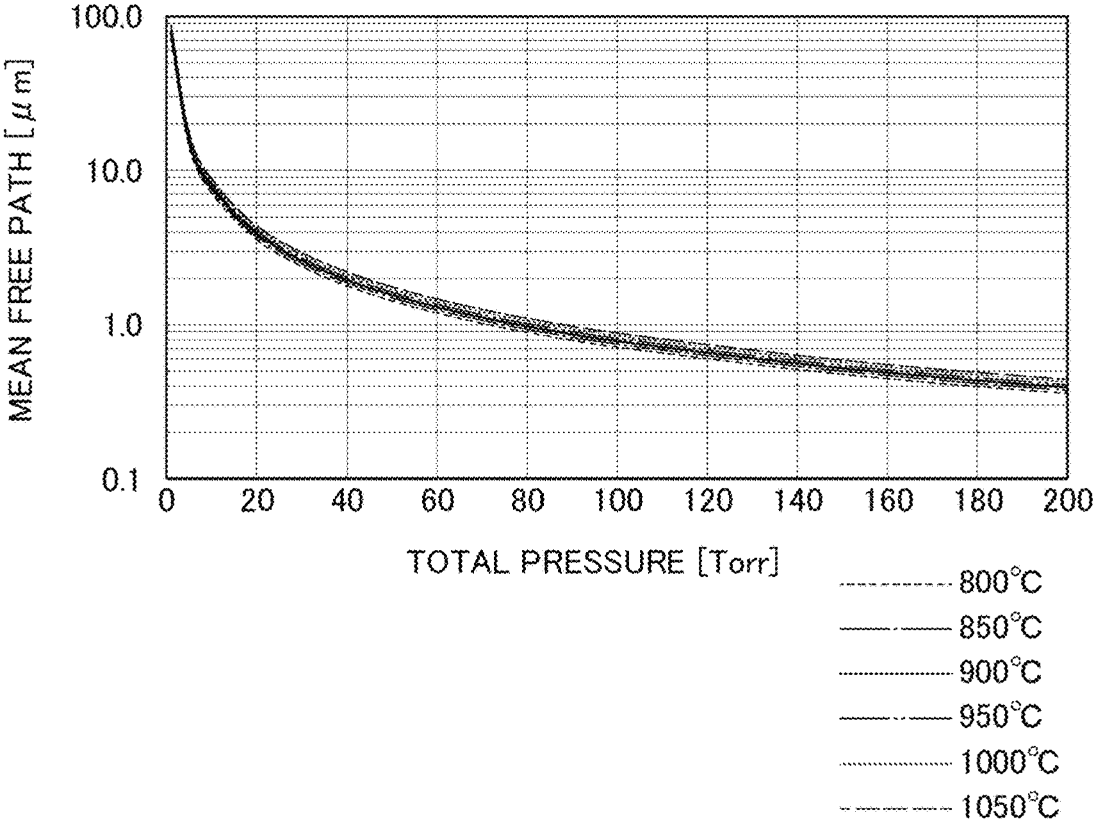
FIG. 11 is a graph showing a mean free path of MTS from 800 degrees C. to 1050 degrees C. and at from 0 Torr to 200 Torr in total pressure in the embodiment of the present disclosure.

FIG. 10 is a graph showing a mean free path of MTS from 800 degrees C. to 1050 degrees C. and at from 0 Torr to 800 Torr. FIG. 11 is a graph showing a mean free path of MTS from 800 degrees C. to 1050 degrees C. and at from 0 Torr to 200 Torr in total pressure. In FIGS. 10 and 11, a pressure is put on the horizontal axis and a mean free path is put on the vertical axis to show the mean free path of MTS at each temperature. By the way, FIG. 11 is a graph in which the range from 0 Torr to 200 Torr in total pressure of FIG. 10 is enlarged. These drawings show that the mean free paths of MTS substantially match with each other in the range from 800 degrees C. to 1050 degrees C.

Figure 12:
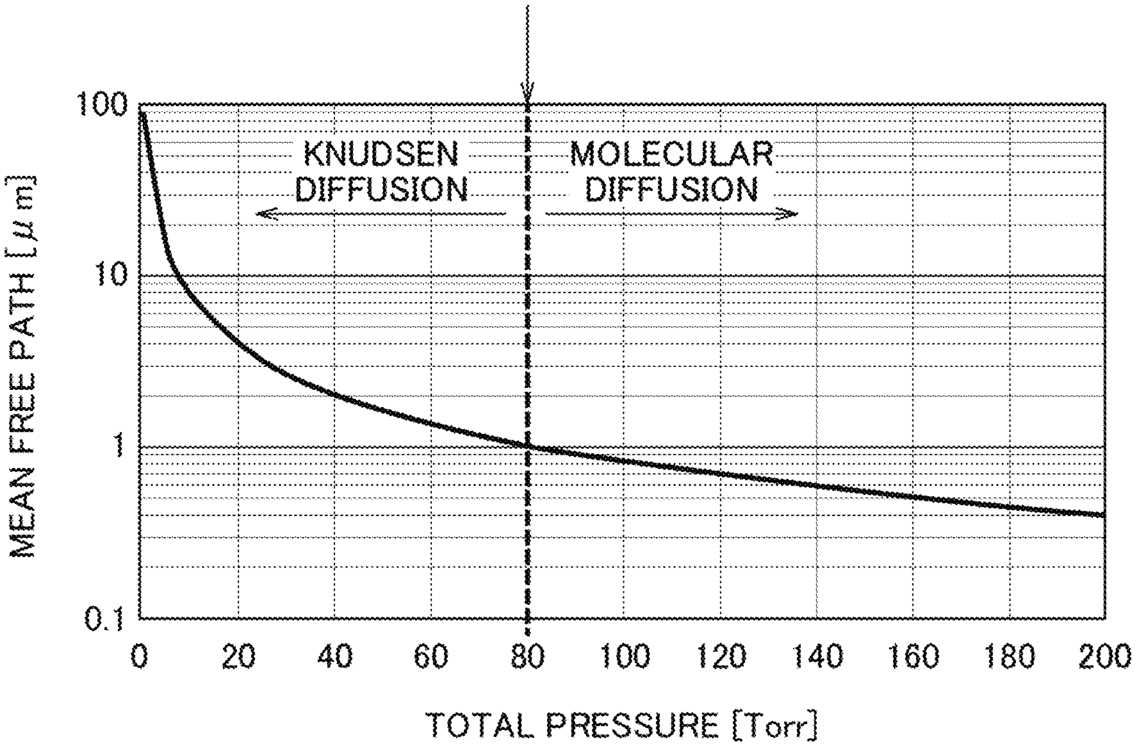
FIG. 12 is a drawing explaining an ingredient diffusion model of MTS in the fiber body in the embodiment of the present disclosure.

The ingredient diffusion model of MTS in the fiber body is set next. FIG. 12 is a drawing explaining an ingredient diffusion model of MTS in the fiber body. In FIG. 12, a pressure is put on the horizontal axis and a mean free path is put on the vertical axis to show the mean free path of MTS at 950 degrees C. of FIG. 11 as a representative. The arrow drawn in FIG. 12 represents a transient area in which the ingredient diffusion model changes.

The ingredient diffusion model of MTS in between the filaments in the fiber bundles will be next described. As the gap among the filaments in the fiber bundles is supposed to be 1 μm in the fiber body model, the pressure when the mean free path of MTS is 1 μm becomes the transient area where the ingredient diffusion model changes. The pressure when the mean free path of MTS is 1 μm is 80 Torr in total pressure. The ingredient diffusion model of MTS in between the filaments in the fiber bundles therefore changes at 80 Torr in total pressure in the range from 800 degrees C. to 1050 degrees C.

In a case where the pressure is lower than 80 Torr in total pressure, the ingredient diffusion model of MTS in between the filaments in the fiber bundles becomes the Knudsen diffusion. In a case where the pressure is higher than 80 Torr in total pressure, the ingredient diffusion model of MTS in between the filaments in the fiber bundles becomes the molecular diffusion model. In a case where the pressure is 80 Torr in total pressure, the ingredient diffusion model of MTS in between the filaments in the fiber bundles becomes the transient area between the Knudsen diffusion and the molecular diffusion.

The ingredient diffusion model of MTS in between the fiber bundles will be next described. The gap between the fiber bundles is in general far greater than 100 μm. The gap between the fiber bundles is therefore larger than the mean free path of MTS. The ingredient diffusion model of MTS is therefore supposed to be the molecular diffusion.

The Knudsen diffusion constant and the molecular diffusion constant at from 800 degrees C. to 1050 degrees C. and at from 0 Torr to 800 Torr are calculated. The Knudsen diffusion constant $D_k$ of MTS is obtained from the formulae 2 and 3. The gap a between the filaments is supposed to be 1 μm. The gas constant R is supposed to be 8.31 J·mol/K. The molecular weight M is supposed to be 149.5 g/mol that is a molecular weight of MTS.

The molecular diffusion constant $D_m$ of MTS is obtained from the formulae 4 through 6. The molecular weight M is supposed to be 149.5 g/mol that is a molecular weight of MTS. The Boltzmann constant k is supposed to be $1.38\times10^{-23}$ J/K. To the Lenneard-Jones parameters σ, ε, the Lenneard-Jones parameters of MTS listed in Table 1 are applied.

The Knudsen diffusion constant and the molecular diffusion constant of MTS at 950 degrees C. and at from 0 Torr to 300 Torr as a representative will be described. FIG. 13 is a graph showing a Knudsen diffusion constant $D_k$, and a molecular diffusion constant $D_m$ at 950 degrees C. and at from 0 Torr to 300 Torr in total pressure. In FIG. 13, a pressure is put on the horizontal axis and a diffusion constant is put on the vertical axis to show the Knudsen diffusion constant $D_k$ and the molecular diffusion constant $D_m$. It shows that the Knudsen diffusion constant $D_k$ is about two orders smaller than the molecular diffusion constant $D_m$.

(Reaction Model Setting Step)

In the reaction model setting step, the reaction model when film growth of SiC is made from MTS is set. The reaction model is set on the basis of the film species for SiC and the sticking probability of the film species. The film species for SiC includes chemical species containing C, chemical species containing Si—C and chemical species containing Si.

In a case where the film growth of SiC is executed by thermal decomposition of MTS or such, it is known that the chemical species containing C determines the reaction rate of the film growth of SiC. It is further known that such chemical species containing C includes two distinct chemical species containing C that differ in chemical activity. Thus, as the film species for SiC, two chemical species are set as first film species and second film species. The first film species are $C_2H_4$ and $C_2H_2$. The second film species are $C_2H_5$ and $CH_3$.

Next, the sticking probabilities and the contribution rates of the first film species and the second film species are set. The sticking probabilities and the contribution rates of the first film species and the second film species are obtained by a micro cavity method using publicly known trench substrates, multi-scale analysis and such with reference to the pamphlet of WO 2015/129772 or such.

Figure 14A:
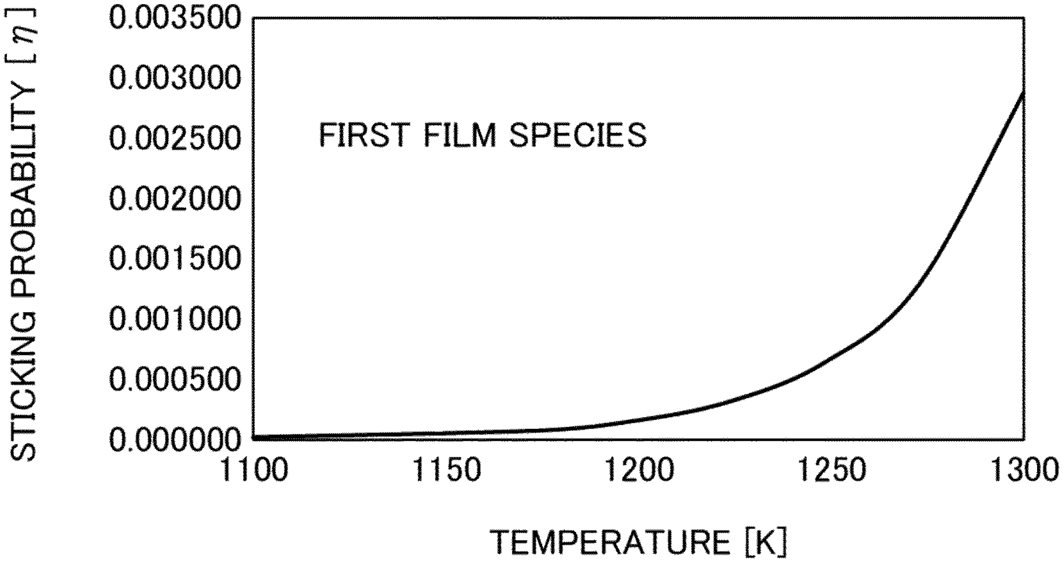
FIGS. 14A and 14B are graphs showing relations between temperatures and sticking probabilities of a first film species and a second film species in the embodiment of the present disclosure.
Figure 14B:
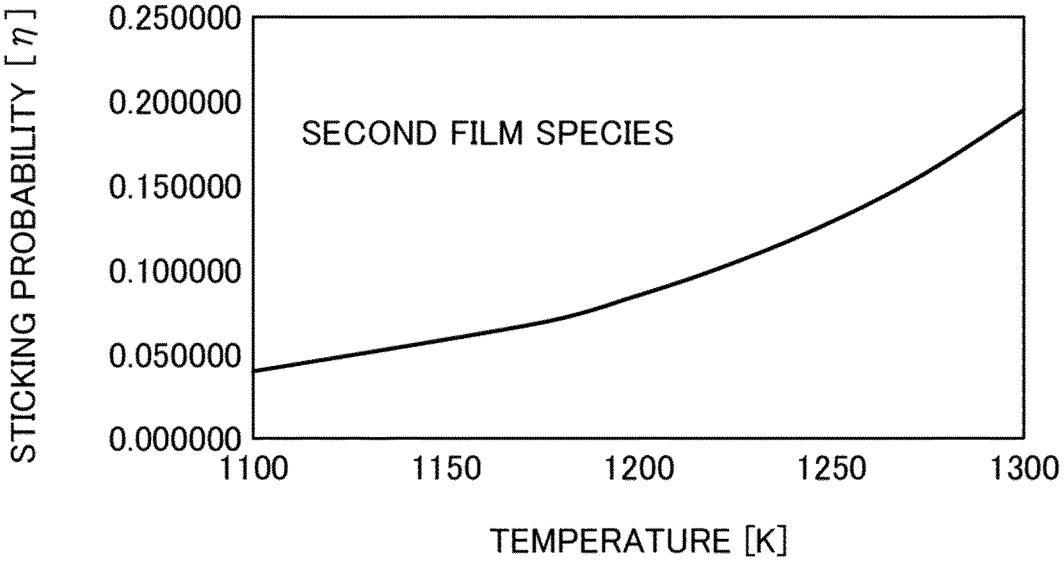

FIGS. 14A and 14B are graphs showing a relation between temperatures and sticking probabilities of the first film species and the second film species, where FIG. 14A is a graph about the first film species and FIG. 14B is a graph about the second film species. In the graphs of FIG. 14A and FIG. 14B, the temperature is put on the horizontal axis and the sticking probability is put on the vertical axis to show the sticking probabilities at respective temperatures. The sticking probabilities of the first film species and the second film species change with temperature.

Table 2 is a summary of the sticking probabilities of the first film species and the second film species at from 800 degrees C. to 1000 degrees C. The sticking probabilities at 800 degrees C. and 850 degrees C. are obtained by extrapolation of those at from 900 degrees C. to 1000 degrees C. As the sticking probabilities obey the Arrhenius equation, fitting can be executed by an exponential function. By the way, the contribution rate of the first film species is supposed to be 0.80 and the contribution rate of the second film species is supposed to be 0.20.

TABLE 2

| TEMPERATURE ° C. | FIRST FILM SPECIES η | SECOND FILM SPECIES η |
|---|---|---|
| 1000 | 0.001560 | 0.170 |
| 975 | 0.000501 | 0.105 |
| 950 | 0.000299 | 0.093 |
| 925 | 0.000101 | 0.096 |
| 900 | 0.000100 | 0.063 |
| 850 | 1.42535E−05 | 0.044731774 |
| 800 | 3.44527E−06 | 0.029538192 |

The surface reaction rate constant $k_s$ is obtained from the film species of SiC and the sticking probability. The surface reaction rate constant $k_s$ is obtained by the formula 7. The average velocity v of the molecules is obtained from the formula 3. The gas constant R is supposed to be 8.31 J·mol/K. The molecular weights M are supposed to be molecular weights of the first film species and the second film species. The sticking probabilities of the first film species and the second film species listed on Table 2 are applied to the sticking probability n.

(Ingredient Concentration Distribution Calculation Step)

In the ingredient concentration distribution calculation step, the ingredient concentration distribution of MTS diffusing in the fiber body is calculated. The ingredient concentration distribution is supposed to be an ingredient concentration distribution of MTS in the thickness direction of the fiber body. The ingredient concentration distribution of MTS is obtained from the formulae 8 and 9. The ingredient concentration distribution of MTS is calculated at from 800 degrees to 1000 degrees C. and at from 5 Torr to 760 Torr in total pressure. Ways of obtaining the diffusion constant D of MTS and the reaction rate constant $k_v$ per unit volume will be next described.

A case of from 800 degrees C. to 1000 degrees C. and a total pressure smaller than 80 Torr will be first described. In this case, the ingredient diffusion model of MTS becomes the Knudsen diffusion model in between the filaments in the fiber bundles and becomes the molecular diffusion model in between the fiber bundles. As shown in FIG. 13, as the Knudsen diffusion constant is two or more orders of magnitude smaller than the molar diffusion constant, diffusion of MTS in between the filaments in the fiber bundles is not necessary to be considered. The molecular diffusion constant $D_m$ is thus applied to the diffusion constant of MTS.

The reaction rate constant $k_v$ per unit volume is obtained from the formula 10. To the surface reaction rate constant $k_s$, that obtained in the reaction model setting step is applied. The area S and the volume V are obtained from the fiber body unit cell. As the Knudsen diffusion constant is two or more orders of magnitude smaller than the molecular diffusion constant, the surface reaction on the peripheral surfaces of the fiber bundles is predominant over the surface reaction on the filaments in the fiber bundles. The surface areas of the filaments in the fiber bundles are thus negligible. The area S is therefore supposed to be the total area of the surface areas of the peripheral surfaces of the fiber bundles. The volume V is a spatial volume of the fiber body which does not include that of the filaments.

A case of from 800 degrees C. to 1000 degrees C. and a total pressure greater than 80 Torr will be next described. In this case, MTS does molecular diffusion both in between the filaments in the fiber bundles and in between the fiber bundles. To the diffusion constant of MTS, the molecular diffusion constant $D_m$ is thus applied.

The reaction rate constant $k_v$ per unit volume is obtained from the formula 10. To the surface reaction rate constant $k_s$, that obtained in the reaction model setting step is applied. The area S and the volume V are obtained from the fiber body unit cell. As MTS does molecular diffusion both in between the filaments in the fiber bundles and in between the fiber bundles, as with the consumption of MTS by the film growth on the peripheral surfaces of the fiber bundles, consumption of MTS by film growth on the filaments in the fiber bundles becomes large. To the area S, the total area of the surface areas of the peripheral surfaces of the fiber bundles is applied. The volume V is a spatial volume of the fiber body which does not include that of the filaments.

The molecular diffusion constant $D_m$ and the reaction rate constant $k_v$ per unit are assigned to the formulae 8 and 9 to obtain the relative ingredient concentration $C_x/C_0$ of MTS in the fiber body. The relative ingredient concentration $C_x/C_0$ is a ratio of the ingredient concentration $C_x$ in the fiber body at a depth x in the thickness direction from its surface to the ingredient concentration $C_0$ in the fiber body at the surface in the thickness direction. The thickness L of the fiber body is supposed to be 10 mm. The partial pressure ratio of MTS to the carrier gas contained in the film growth gas is supposed to be 1:1. The carrier gas is supposed to be $H_2$ (hydrogen).

By the way, in a case of from 800 degrees C. to 1000 degrees C. and 80 Torr in total pressure, the ingredient diffusion model fall in a transient area between the Knudsen diffusion model and the molecular diffusion model in the filaments in the fiber bundles. In this case, the relative ingredient concentration $C_x/C_0$ obtained on the assumption that the ingredient diffusion model in between the filaments in the fiber bundles is the Knudsen diffusion and the relative ingredient concentration $C_x/C_0$ obtained on the assumption that the ingredient diffusion model in between the filaments in the fiber bundles is the molecular diffusion are averaged to obtain the value.

Figure 15:
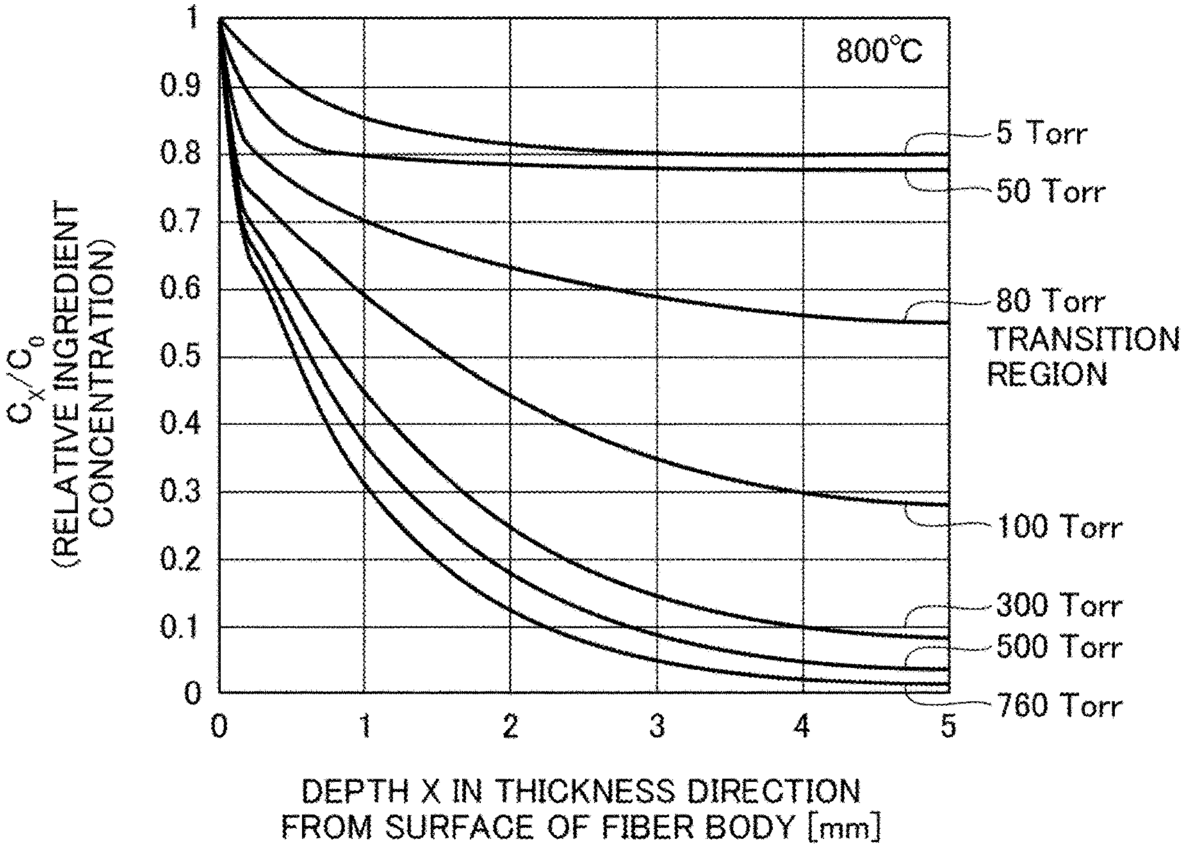
FIG. 15 is a graph showing an ingredient concentration distribution of MTS at 800 degrees C. in the embodiment of the present disclosure.
Figure 16:
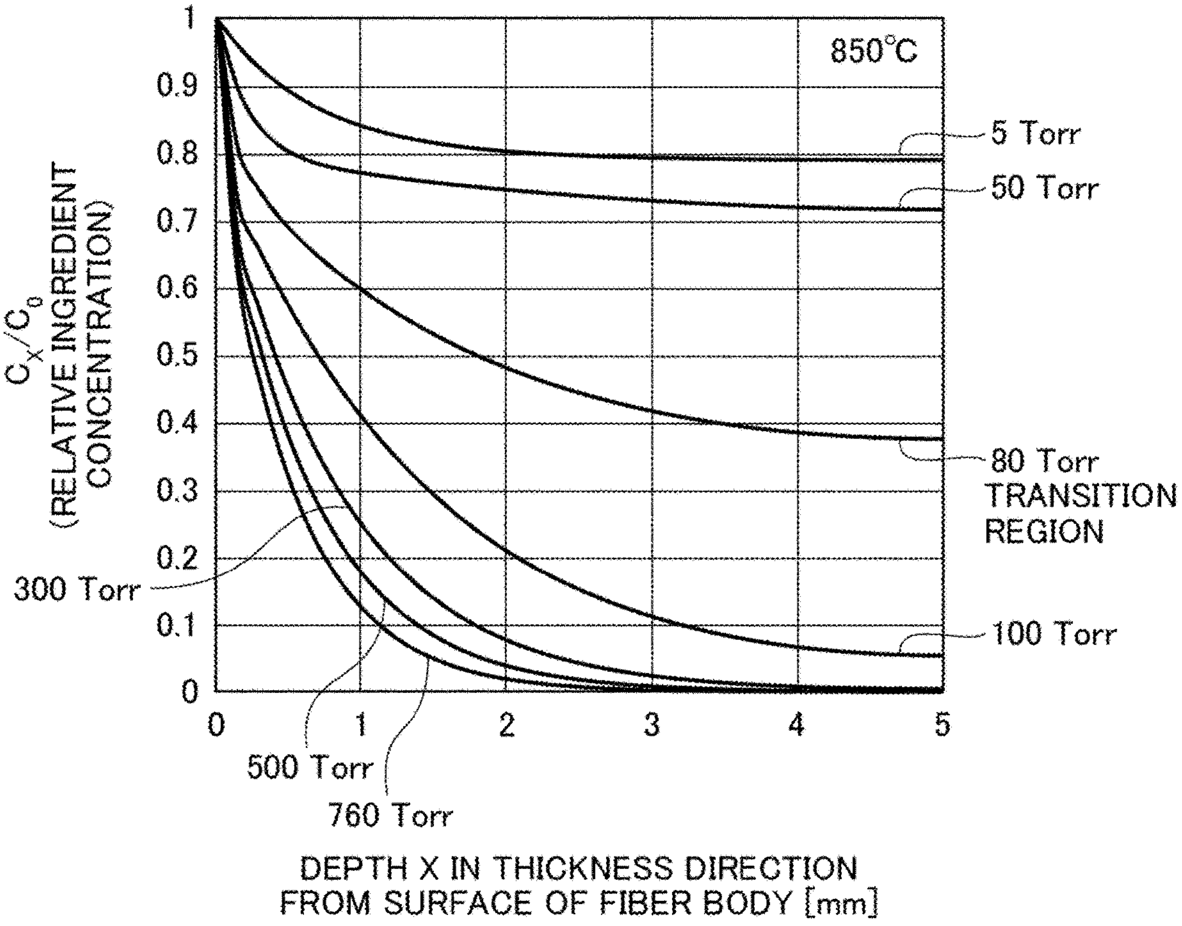
FIG. 16 is a graph showing an ingredient concentration distribution of MTS at 850 degrees C. in the embodiment of the present disclosure.
Figure 17:
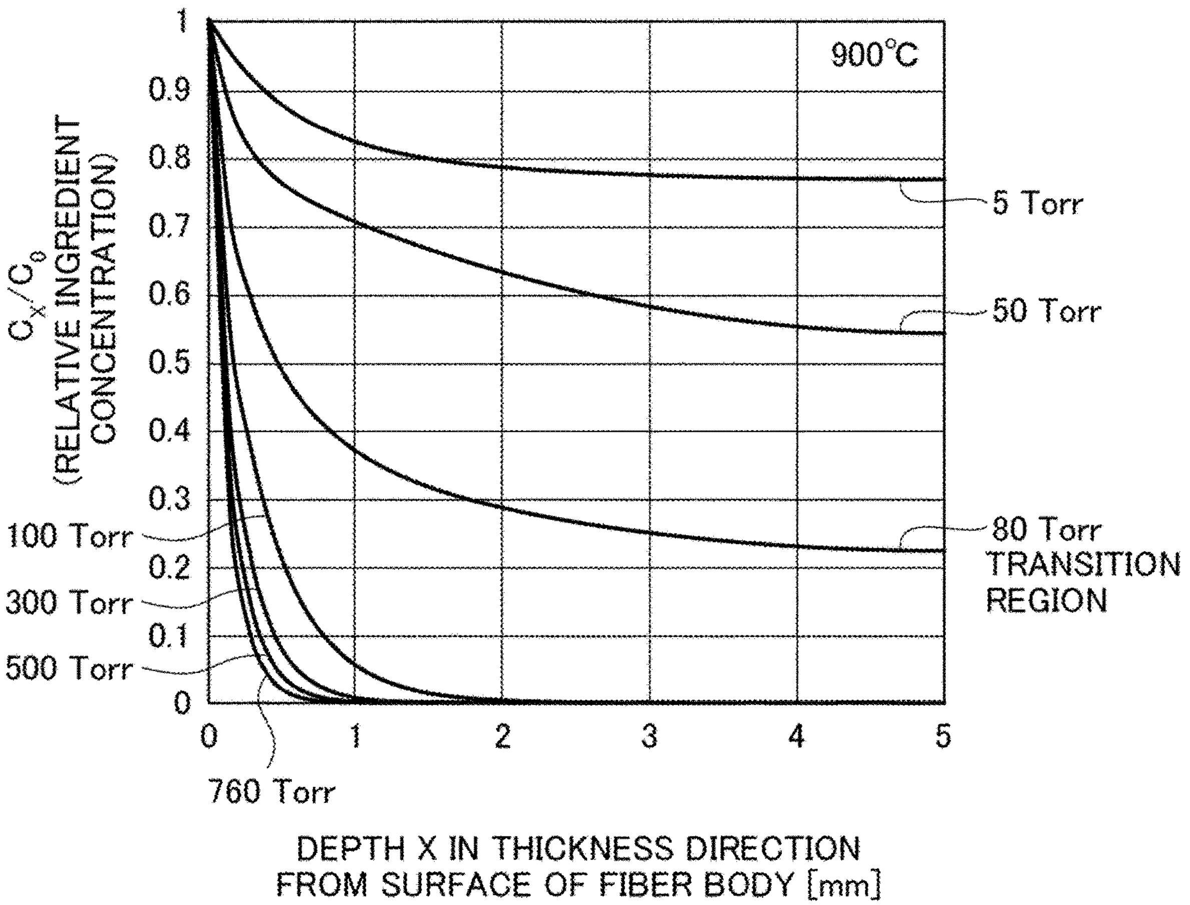
FIG. 17 is a graph showing an ingredient concentration distribution of MTS at 900 degrees C. in the embodiment of the present disclosure.
Figure 18:
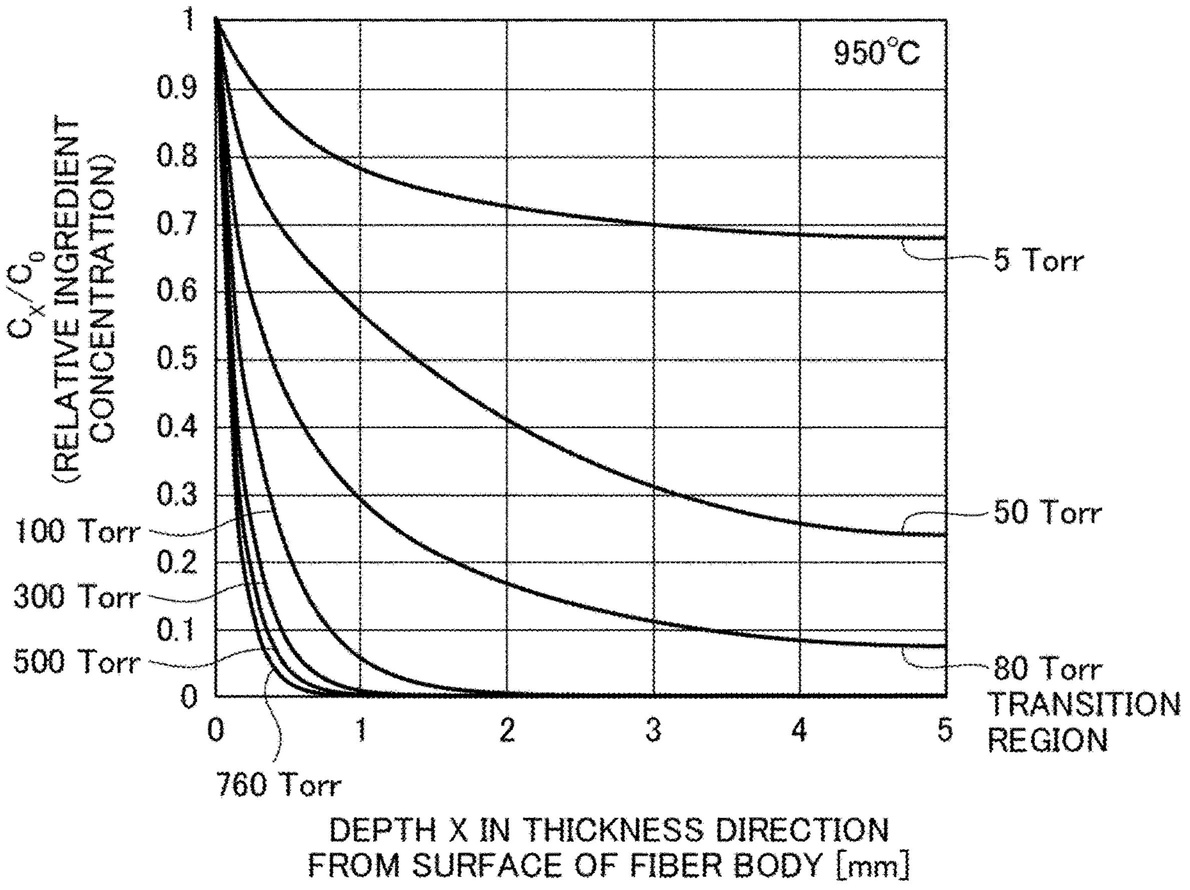
FIG. 18 is a graph showing an ingredient concentration distribution of MTS at 950 degrees C. in the embodiment of the present disclosure.
Figure 19:
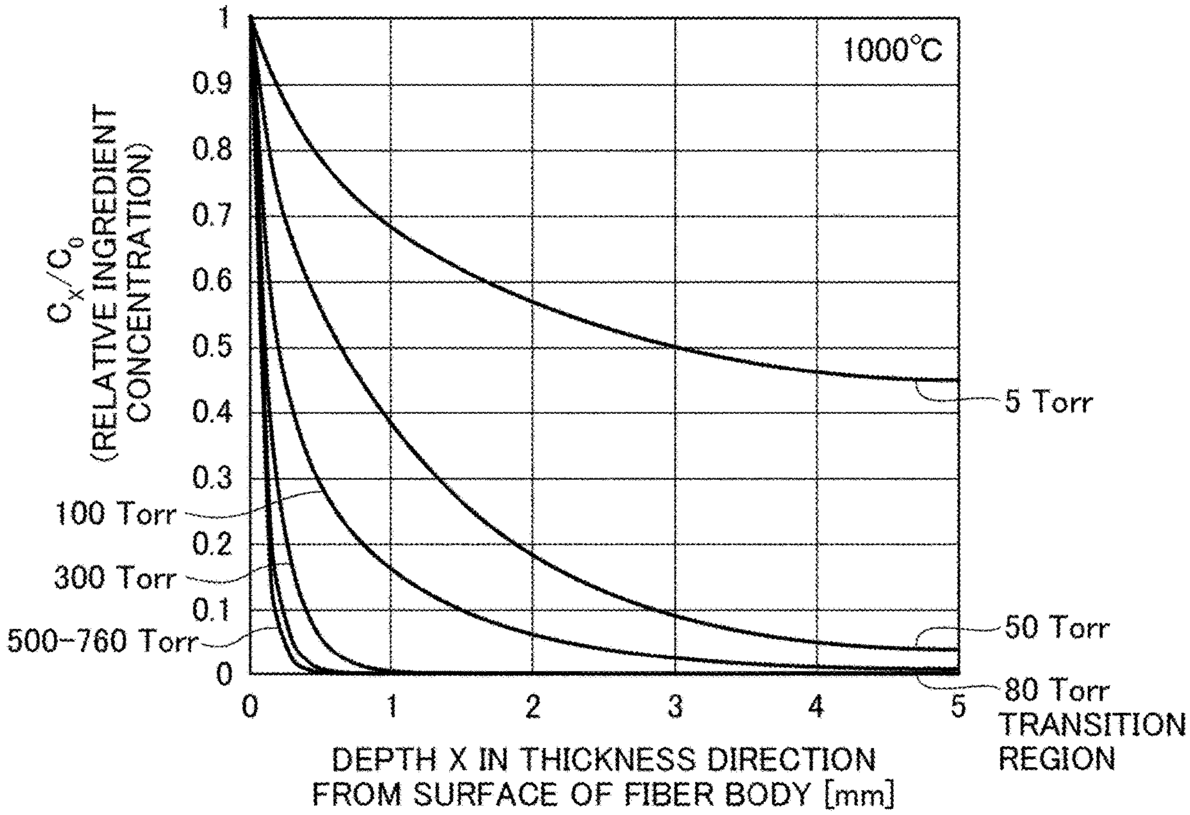
FIG. 19 is a graph showing an ingredient concentration distribution of MTS at 1000 degrees C. in the embodiment of the present disclosure.

FIG. 15 is a graph showing an ingredient concentration distribution of MTS at 800 degrees C. FIG. 16 is a graph showing an ingredient concentration distribution of MTS at 850 degrees C. FIG. 17 is a graph showing an ingredient concentration distribution of MTS at 900 degrees C. FIG. 18 is a graph showing an ingredient concentration distribution of MTS at 950 degrees C. FIG. 19 is a graph showing an ingredient concentration distribution of MTS at 1000 degrees C. In FIG. 15 through FIG. 19, the depth x in the thickness direction from the surface of the fiber body is put on each horizontal axis and the relative ingredient concentration $C_x/C_0$ is put on each vertical axis to show the relative ingredient concentration $C_x/C_0$ of MTS at from 5 Torr to 760 Torr.

As shown in FIGS. 15 through 19, the relative ingredient concentration $C_x/C_0$ becomes smaller as the depth x in the thickness direction from the surface of the fiber body becomes greater. The degree of decrease of the relative ingredient concentration $C_x/C_0$ gets smaller as the infiltration pressure gets higher. In FIGS. 15 through 19, at the central portion in the thickness direction of the fiber body, the degree of decrease of the relative ingredient concentration $C_x/C_0$ is minimum at 5 Torr in total pressure, and the degree of decrease of the relative ingredient concentration $C_x/C_0$ is maximum at 760 Torr in total pressure. On the other hand, in regard to the amount of fed MTS, more MTS is fed to the fiber body as the infiltration pressure is higher, and less MTS is fed to the fiber body as the infiltration pressure is lower. The ingredient concentration $C_x$ at the depth x in the thickness direction from the surface of the fiber body is therefore determined by a balance between the fed amount of MTS into the fiber body and the degree of decrease of the relative ingredient concentration $C_x/C_0$ in the fiber body.

(Film Growth Rate Calculation Step)

In film growth rate calculation step, the film growth rate of SiC throughout the fiber body is calculated. The film growth rate of SiC at the depth x in the thickness direction from the surface of the fiber body is first obtained. The film growth rate Rx of SiC at the depth x in the thickness direction from the surface of the fiber body is obtained from the formula 11 on the basis of the surface reaction rate constant $k_s$ and the ingredient concentration $C_x$ of MTS at the depth x in the thickness direction from the surface of the fiber body. The surface reaction rate constant $k_s$ is obtained from the formula 7. The ingredient concentration $C_x$ of MTS at the depth x in the thickness direction from the surface of the fiber body is obtained from the formulae 8 through 9. The ingredient concentration $C_0$ at the surface in the thickness direction of the fiber body is obtained from vapor phase composition analysis by a quadrupole mass analyzer or such, and any analysis. The film growth rate Rx of SiC at the depth x in the thickness direction from the surface of the fiber body is thus obtained.

The film growth rate of SiC throughout the fiber body is next calculated. The film growth rate of SiC throughout the fiber body is calculated by integrating the film growth rate Rx of SiC at the depth x in the thickness direction from the surface of the fiber body over the thickness direction of the fiber body. In more detail, the film growth rate of SiC throughout the fiber body is obtained by integrating the film growth rate Rx of the ceramic at the depth x in the thickness direction from the surface of the fiber body from 0 mm to 5 mm in the thickness direction of the fiber body and then doubling the result.

Figure 20:
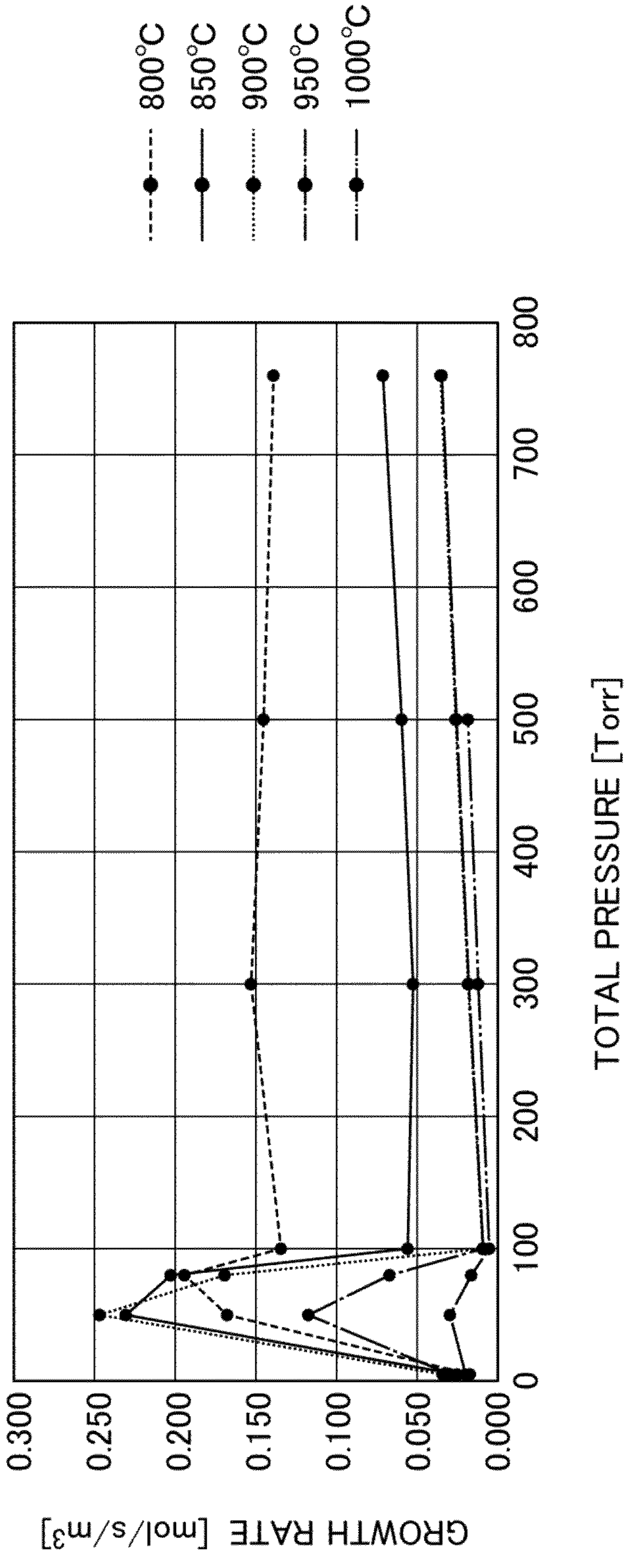
FIG. 20 is a graph showing a film growth rate of SiC throughout the fiber body from 800 degrees C. to 1000 degrees C. and at from 5 Torr to 760 Torr in the embodiment of the present disclosure.
Figure 21:
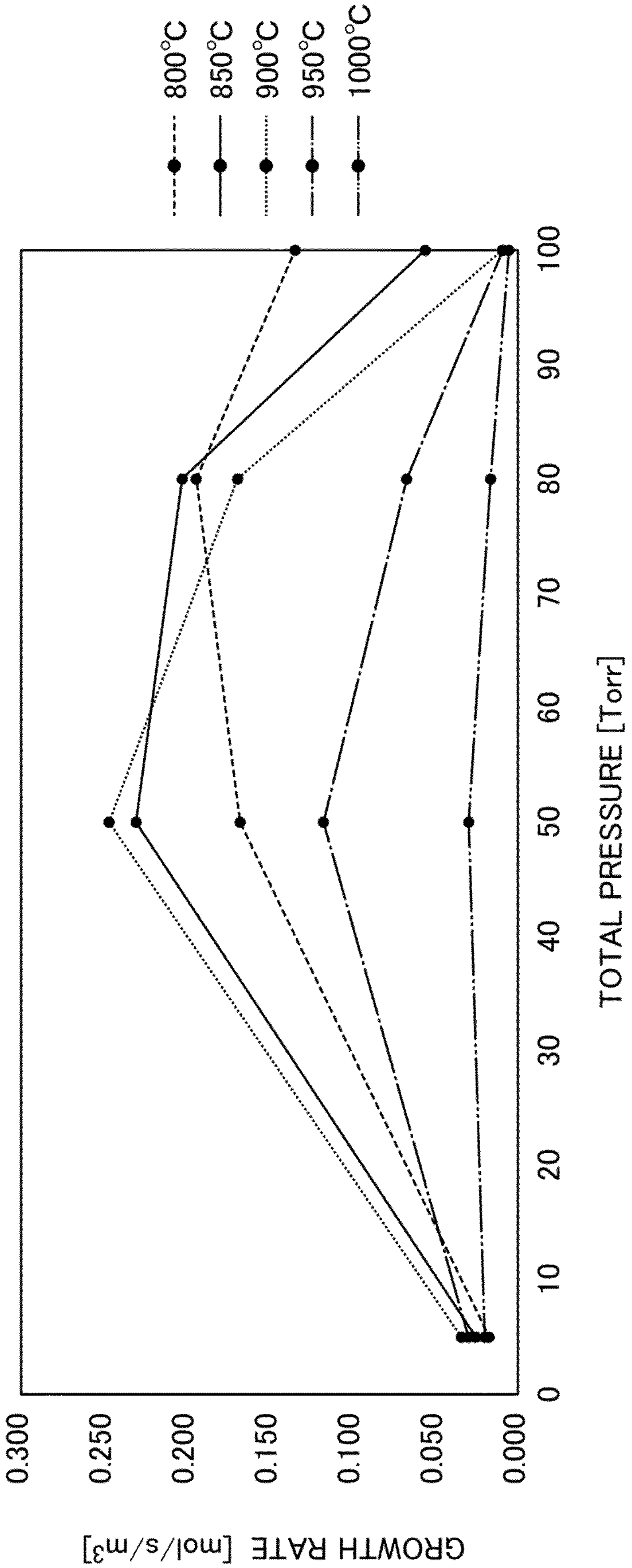
FIG. 21 is a graph showing a film growth rate of SiC throughout the fiber body from 800 degrees C. to 1000 degrees C. and at from 5 Torr to 100 Torr in the embodiment of the present disclosure.

FIG. 20 is a graph showing a film growth rate of SiC throughout the fiber body from 800 degrees C. to 1000 degrees C. and at from 5 Torr to 760 Torr. FIG. 21 is a graph showing a film growth rate of SiC throughout the fiber body from 800 degrees C. to 1000 degrees C. and at from 5 Torr to 100 Torr. In FIGS. 20 and 21, a pressure is put on the horizontal axis and a film growth rate is put on the vertical axis to show relations between the pressure at each temperature and the film growth rate of SiC. By the way, FIG. 21 is a graph in which the range from 5 Torr to 100 Torr in total pressure of FIG. 20 is enlarged. Further, in FIG. 20, in the range over 100 Torr in total pressure, the graphs of 900 degrees C. and 950 degrees C. coincide with each other.

(Infiltration Condition Determination Step)

In the infiltration condition determination step, the infiltration temperature and the infiltration pressure relative to the infiltration temperature at which the film growth rate of SiC throughout the fiber body relative to the infiltration temperature becomes maximum are determined. In more detail, the infiltration temperature and the infiltration pressure at which the film growth rate of SiC throughout the fiber body relative to the infiltration temperature becomes maximum are determined from FIGS. 20 and 21. In a case where the infiltration temperature is from 800 degrees C. to 1000 degrees C., the film growth rate of Sic throughout the fiber body can be maximized at the infiltration pressure of from 50 Torr to 80 Torr in total pressure. In a case where the infiltration temperature is 800 degrees C., the film growth rate of SiC throughout the fiber body can be maximized at the infiltration pressure of 80 Torr in total pressure. In a case where the infiltration temperature is from 850 degrees C. to 1000 degrees C., the film growth rate of SiC throughout the fiber body can be maximized at the infiltration pressure of 50 Torr in total pressure.

In the infiltration condition determination step, the infiltration temperature and the infiltration pressure at which the film growth rate of SiC throughout the fiber body relative to the infiltration temperature becomes maximum may be determined. From FIGS. 20 and 21, at the infiltration temperature of from 850 degrees C. to 900 degrees C. and at the infiltration pressure of 50 Torr in total pressure, the film growth rate of SiC throughout the fiber body can be maximized. Further, at the infiltration temperature of 900 degrees C. and at the infiltration pressure of 50 Torr in total pressure, the film growth rate of SiC throughout the fiber body can be maximized. The infiltration condition can be thus determined.

By the way, relative to the aforementioned infiltration temperature of from 800 degrees C. to 1000 degrees C., 80 Torr in total pressure as the upper limit of the infiltration pressure at which the film growth rate of SiC throughout the fiber body is corresponding to the pressure at the transient area in the diffusion model in between the filaments in the fiber body. As shown in FIG. 12, the ingredient diffusion model in between the filaments in the fiber bundles transits from the Knudsen diffusion to the molecular diffusion at 80 Torr in total pressure. Thus the infiltration pressure to relative the aforementioned infiltration temperature of from 800 degrees C. to 1000 degrees C. at which the film growth rate of SiC throughout the fiber body, beyond 50 Torr in total pressure, becomes the pressure of the transient area in the diffusion model in between the filaments in the fiber bundles. The reason why the upper limit of the infiltration pressure at which the film growth rate of SiC throughout the fiber body is corresponding to the pressure at the transient area in the diffusion model in between the filaments in the fiber body is mainly originated from that S/V in the formula 10 changes in the transient area in the diffusion model in between the filaments in the fiber bundles.

The pressure corresponding to the transient area in the ingredient diffusion model changes with the gap between the filaments in the fiber bundles. 80 Torr in total pressure is a pressure in the transient model in the diffusion model in between the filaments in the fiber bundles in a case where the gap between the filaments in the fiber bundles is 1 μm. For example, from FIGS. 10 and 11, in a case where the gap between the filaments in the fiber bundles is 0.5 μm, 140 Torr in total pressure is a pressure in the transient model in the diffusion model in between the filaments in the fiber bundles. In a case where the gap between the filaments in the fiber bundles is 0.1 μm, 800 Torr in total pressure is a pressure in the transient model in the diffusion model in between the filaments in the fiber bundles.

In the aforementioned fiber body model, as the gap between the filaments in the fiber bundles is set to be 1 μm, in a case where the infiltration temperature is from 800 degrees C. to 1000 degrees C., the film growth rate of Sic throughout the fiber body at the infiltration pressure of from 50 Torr to 80 Torr in total pressure can be maximized. In the fiber body model, when the gap between the filaments in the fiber bundles is set to be smaller than 1 μm, in a case where the infiltration temperature is from 800 degrees C. to 1000 degrees C., the upper limit of the infiltration pressure is not limited to 80 Torr in total pressure but the film growth rate of SiC throughout the fiber body at the infiltration pressure of 50 Torr or more in total pressure can be maximized.

The impregnation process (S12) will be next described. In the impregnation process (S12), chemical vapor infiltration is carried out under the infiltration condition determined in the impregnation condition determination process (S10) to impregnate the fiber body with SiC. Descriptions about the impregnation process (S12) will be given with reference to the covering device 10 for the fiber body shown in FIG. 1.

The fiber body A is set in place in the reaction container 22 of the reaction furnace 20. After setting the fiber body A, the reaction container 22 is evacuated by the exhaustion pump 52. The ingredient and the carrier gas are next introduced into the reaction container 22 through the gas feeding section 14. MTS is applied to the ingredient. $H_2$ is applied to the carrier gas. The control section 18 controls the first on-off valve 34 and the first mass flow controller 36 to regulate the flow rate of MTS. The control section 18 controls the second on-off valve 40 and the second mass flow controller 42 to regulate the flow rate of $H_2$. Then the film growth gas including MTS and $H_2$ is fed to the reaction container 22.

The control section 18 controls the reaction section 12, the gas feeding section 14 and the gas exhaustion section 16 to regulate the interior at the infiltration temperature and the infiltration pressure determined in the impregnation condition determination process (S10). The control section 18 controls the heater 24 to heat the reaction container 22, thereby regulating the temperature in the reaction container 22 to be the infiltration temperature determined in the impregnation condition determination process (S10). The control section 18 controls the first on-off valve 34, the second on-off valve 40, the third on-off valve 50 and the exhaustion pump 52 to regulate the pressure in the reaction container 22 to be the infiltration pressure determined in the impregnation condition determination process (S10). In the impregnation condition determination process (S10), as described above, in a case where the infiltration temperature is determined to be from 800 degrees C. to 1000 degrees C. and the infiltration pressure is determined to be from 50 Torr to 80 Torr in total pressure, the control section 18 controls parameters to match this infiltration condition.

MTS/$H_2$ as a partial pressure ratio of MTS to $H_2$ may be from 0.3 to 2.5. To keep MTS/$H_2$ from 0.3 to 2.5, the chemical composition of SiC can be made to match the stoichiometric composition or any chemical composition close thereto. The partial pressure of MTS to $H_2$ is identical to a molar ratio of MTS to $H_2$.

MTS/$H_2$ may be from 1.0 to 2.5. To keep MTS/$H_2$ from 1.0 to 2.5, a quality of infiltration of SiC can be improved. Then SiC is sufficiently grown not only in between the fiber bundles in the fiber body A but also in between the filaments in the fiber bundles to cover them. Further, to keep MTS/$H_2$ from 1.0 to 2.5, deposition of by-products can be suppressed. Descriptions about the by-products will be given later.

MTS/$H_2$ may be 1.0. To keep MTS/$H_2$ to be 1.0, as well as the chemical composition of SiC can be further made to match the stoichiometric composition, the quality of infiltration of SiC can be further improved. Further, to keep MTS/$H_2$ to be 1.0, deposition of by-products can be suppressed.

In the impregnation process (S12), as thermal decomposition of MTS diffusing in the fiber body A occurs or on other grounds, SiC grows in between the fiber bundles in the fiber body A and in between the filaments in the fiber bundles and is then made to impregnate therein. As infiltration is made under the infiltration pressure at which the film growth rate of SiC throughout the fiber body relative to the infiltration temperature becomes maximum, it is enabled to rapidly cover the fiber body with SiC. Further, as SiC grows and infiltrates in between the fiber bundles in the fiber body A and in between the filaments in the fiber bundles in parallel, it is enabled to further rapidly cover the fiber body with SiC.

Detailed descriptions about the by-products will be next given. The by-products are mainly formed of chlorosilane polymers. The chlorosilane polymers are by-products formed by cooling $SiCl_2$ as a precursor of the chlorosilane polymers down to the room temperature or its vicinity and then causing its polymerization. The chlorosilane polymers yield harmful substances such as silicon oxalate on hydrolysis in the air or such. Meanwhile $SiCl_2$ is a substance produced by thermal decomposition of MTS.

In a case where the infiltration is carried out at the infiltration temperature of from 800 degrees C. to 1000 degrees C. and at the infiltration pressure of 5 Torr in total pressure, a large quantity of the by-products is deposited. The reason is that a reaction rate of a vapor phase reaction for reforming $SiCl_2$ into other stable substances such as $SiCl_4$ is reduced when the infiltration pressure is quite low. The quantity of residual $SiCl_2$ is consequently large and therefore the large quantity of the by-products is deposited.

On the other hand, in a case where the infiltration is carried out at the infiltration temperature of from 800 degrees C. to 1000 degrees C. and at the infiltration pressure of 50 Torr or higher in total pressure, production of the by-products can be suppressed. The reason is that the reaction rate of the vapor phase reaction for reforming $SiCl_2$ into other stable substances such as $SiCl_4$ is increased when the infiltration pressure is quite high. The quantity of residual $SiCl_2$ is consequently reduced down to substantially none and therefore production of the by-products can be suppressed. As the production of the by-products can be suppressed, for example, maintenance of the exhaustion pump 52 is made easier.

The residence time of $SiCl_2$ in the reaction container 22 may be from 4 seconds to 20 seconds at 50 Torr or higher in total pressure. As the vapor phase reaction for reforming $SiCl_2$ into other stable substances is thus promoted, production of the by-products can be further suppressed. The residence time of $SiCl_2$ in the reaction container 22 can be regulated on the basis of the inflow rate of the film growth gas flowing into the reaction container 22 and the exhaustion rate of the in-furnace gas exhausted from the reaction container 22.

Further, in a case of a low-pressure circumstance such as an infiltration pressure of 5 Torr in total pressure, an oil-sealed rotary vacuum pump or a mechanical booster pump is applied to the exhaustion pump 52. On the other hand, in a case of a high-pressure circumstance such as an infiltration pressure of 50 Torr or higher in total pressure, it is not necessary to use any high-performance pump such as the oil-sealed rotary vacuum pump and instead a water seal vacuum pump or such can be used. As a failure frequency of the exhaustion pump 52 is consequently reduced, productivity of components is improved.

According to the aforementioned constitution, as the chemical vapor infiltration is carried out under the impregnation condition constituted of the infiltration temperature and the infiltration pressure relative to the infiltration temperature at which the film growth rate of the ceramic throughout the fiber body relative to the infiltration temperature becomes maximum, it is enabled to rapidly cover the fiber body with the ceramic.

According to the aforementioned constitution, as the chemical vapor infiltration is carried out under the impregnation condition constituted of the infiltration temperature and the infiltration pressure at which the film growth rate of the ceramic throughout the fiber body becomes maximum, it is enabled to further rapidly cover the fiber body with the ceramic.

According to the aforementioned constitution, as the chemical vapor infiltration of the ceramic is so carried out that the ceramic grows and infiltrates in between the fiber bundles in the fiber body and in between the filaments in the fiber bundles in parallel, it is enabled to further rapidly cover the fiber body with the ceramic.

EXAMPLES

Evaluation tests about SiC film growth were carried out. In the evaluation tests about SiC film growth, chemical compositions of SiC, qualities of infiltration, film growth rates, film yields and reaction by-products were tested. Film growth of SiC was carried out with using a device for covering a fiber body shown in FIG. 1. MTS was applied to its ingredient. $H_2$ was used as the carrier gas.

In the film growth of SiC, planar substrates and trenched substrates were used. The planar substrates and the trenched substrates were both formed of Si. The planar substrates are substrates with planar surfaces on which SiC films grow. The trenched substrates are substrates with a plurality of trenches formed on these surfaces on which SiC films grow. The trenches of the trenched substrates were about 1 μm wide and about 30 μm deep. The width of the trenches of the trenched substrates was set in accordance with a supposed gap between filaments in a fiber bundle in a fiber body. The planar substrates were used for evaluation of the chemical compositions of SiC, the film growth rates and the film yields. The trenched substrates were used for evaluation of the qualities of infiltration.

The film growth conditions 1 through 4 will be described next. The film growth conditions 2 through 4 were set on the basis of the impregnation condition determination process (S10) as described above. In more detail, the film growth conditions 2 through 4 were so set as to be impregnation condition in that the film growth rates of SiC throughout the fiber bodies would be maximum when the gaps of the trenches were considered as the gaps between the filaments in the fiber bodies. The film growth condition 1 was so set as to be impregnation condition in that the film growth rate of SiC would be not maximum when the gaps of the trenches were considered as the gaps between the filaments in the fiber bodies.

Although the film growth conditions 1 through 4 differed in the infiltration pressures, the other conditions such as the infiltration temperatures were identical. In more detail, the infiltration pressures in the film growth conditions 1 through 4 differed in the partial pressures of MTS, the total pressure as the sum of them with the partial pressure of $H_2$, and MTS/$H_2$ as partial pressure ratios of MTS to $H_2$. The partial pressure ratios of MTS to $H_2$ are identical to molar ratios of MTS to $H_2$. The infiltration temperatures of the film growth conditions 1 through 4 were commonly 950 degrees C.

In the film growth condition 1, the total pressure was 5 Torr, MTS/$H_2$ was 2.5 and the partial pressure of MTS was 3.57 Torr. In the film growth condition 2, the total pressure was 50 Torr, MTS/$H_2$ was 2.5 and the partial pressure of MTS was 35.71 Torr. In the film growth condition 3, the total pressure was 50 Torr, MTS/$H_2$ was 1.0 and the partial pressure of MTS was 25.00 Torr. In the film growth condition 4, the total pressure was 50 Torr, MTS/$H_2$ was 0.3 and the partial pressure of MTS was 11.54 Torr.

Next, the method of evaluation in the evaluation tests about SiC film growth will be described. First, the method of evaluation of the chemical compositions of SiC will be described. The evaluation of the chemical compositions of SiC was carried out by using X-ray photoelectron spectroscopy (XPS). In the evaluation of the chemical compositions of SiC by XPS, Al-Kα (1486.6 eV) was used and scans were carried out in Si (2P) and C (1s) core-level energy regions. Further, the evaluation of the chemical compositions of SiC was carried out respectively at the upstream side and the downstream side in the lengthwise direction of the reaction container.

Figure 22:
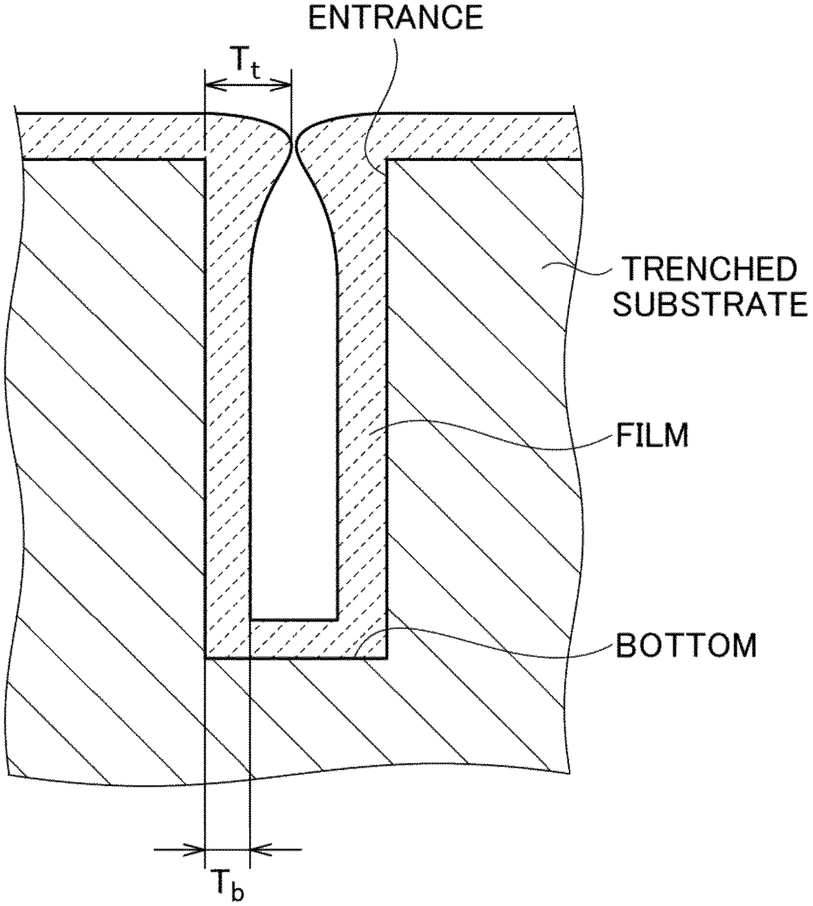
FIG. 22 is a drawing explaining a method for evaluating a quality of infiltration in the embodiment of the present disclosure.

The method of evaluation of the qualities of infiltration will be described. The evaluation of the qualities of infiltration was carried out with using the trenched substrates in regard to step coverages. FIG. 22 is a drawing explaining a method for evaluating a quality of infiltration. The step coverage can be obtained as Tb/Tt as a ratio of a film thickness Tb of SiC at a bottom of a trench bottom to a film thickness Tt of SiC around an entrance of the trench. According to the step coverage, larger values of Tb/Tt show better qualities of infiltration and smaller values show worse qualities of infiltration.

The method of evaluation of the film growth rate will be described. In the method of evaluation of the film growth rate, SiC is grown on planar substrates with changing film growth times and each film thickness of SiC is measured on each film growth time. The thickness of SiC is measured with scanning electron microscopy. Then the film growth rate is obtained by a relation between the film growth time and the film thickness of SiC. In the evaluation of the film growth rate, a maximum film growth rate within the reaction container is evaluated.

The method of evaluation of the film yield will be described. The film yield is obtained by a ratio of a quantity of SiC film (mol/s) to an amount of fed MTS (mol/s). The film yield can be obtained by a quantity of SiC film/an amount of fed MTS.

The method of evaluation of the by-products will be described. In the method of evaluation of the by-products, deposits on the exhaust tubing are evaluated. In regard to the by-products, mainly presence or absence of harmful chlorosilane polymers is evaluated.

Table 3 summarizes the conditions for film growth of SiC in the film growth conditions 1 through 4 and results of evaluation of the film growth of SiC. The results of evaluation of the film growth of SiC resulted from the film growth conditions 1 through 4 will be next described in detail.

TABLE 3

| | TEMPERATURE ° C. | TOTAL PRESSURE Torr | MTS PARTIAL PRESSURE Torr | MTS/$H_2$ PARTIAL PRESSURE RATIO | C/Si UPSTREAM SIDE | C/Si DOWNSTREAM SIDE | STEP COVERAGE | MAXIMUM GROWTH RATE μm/h | YIELD % | CREATION OF BY-PRODUCTS |
|---|---|---|---|---|---|---|---|---|---|---|
| CONDITION 1 | 950 | 5 | 3.57 | 2.5 | 1 ± 0.5 | 1 ± 0.5 | 0.60 | 0.77 | 8.4 | BULKY DEPOSITION OF BY-PRODUCTS |
| CONDITION 2 | 950 | 50 | 35.71 | 2.5 | 1 ± 0.2 | 20 | 0.75 | 15.9 | 11.9 | DEPOSITION OF SOOT |
| CONDITION 3 | 950 | 50 | 25.00 | 1.0 | 1 ± 0.1 | 1 ± 0.1 | 0.80 | 16.4 | 19.8 | DEPOSITION OF SOOT |
| CONDITION 4 | 950 | 50 | 11.54 | 0.3 | 1 ± 0.2 | 1 ± 0.2 | 0.60 | 15.8 | 19 | SOME DEPOSITION OF BY-PRODUCTS |

(SiC Chemical Composition Evaluation Results)

Figure 23:
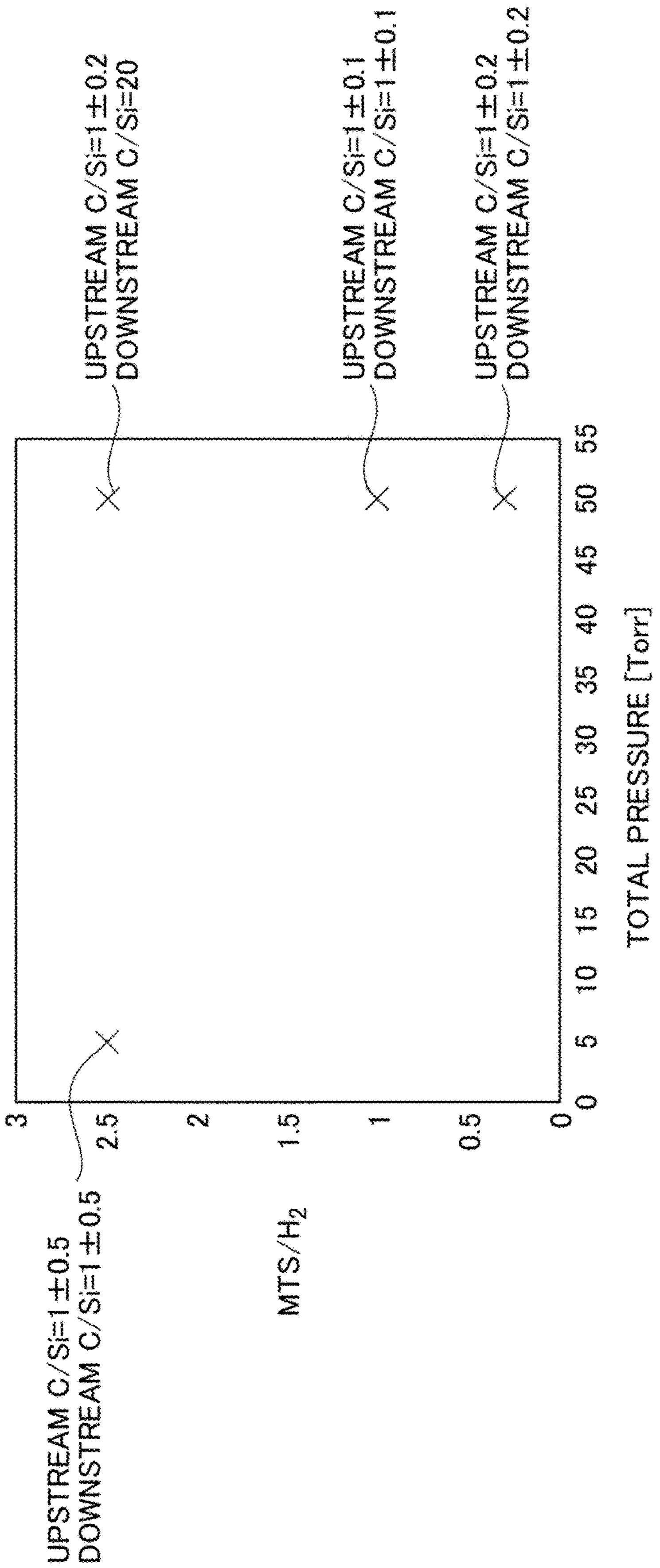
FIG. 23 is a graph showing a result of evaluating chemical compositions of SiC in the embodiment of the present disclosure.

FIG. 23 is a graph showing a result of evaluating chemical compositions of SiC. In the graph of FIG. 23, an infiltration pressure is put on the horizontal axis and $MTS/H_2$ is put on the vertical axis to show chemical compositions of SiC where the film growth is executed under the film growth conditions 1 through 4. The chemical compositions of SiC are shown by C/Si as a ratio of C to Si. A value of C/Si closer to 1 means that SiC come closer to the stoichiometric composition.

In the film growth condition 1, the C/Si values of SiC were in the range of 1±0.2 all across the interior of the reaction container. In the film growth condition 2, the C/Si values of SiC were in the range of 1±0.2 at the upstream side of the reaction container but 20 at the downstream side. In the film growth condition 3, the C/Si values of SiC were 1±0.1 all across the interior of the reaction container. In the film growth condition 4, the C/Si values of SiC were 1±0.2 all across the interior of the reaction container.

At the upstream side in the film growth condition 2 and all across the interior of the reaction container in the film growth conditions 3 and 4, variability in the chemical compositions of SiC was quite small. In the film growth conditions 3 and 4, variability in the chemical compositions of SiC was smaller than those in the film growth condition 2. On the other hand, in the film growth condition 1, there's large variability in the chemical compositions of SiC.

(Infiltration Quality Evaluation Result)

Figure 24:
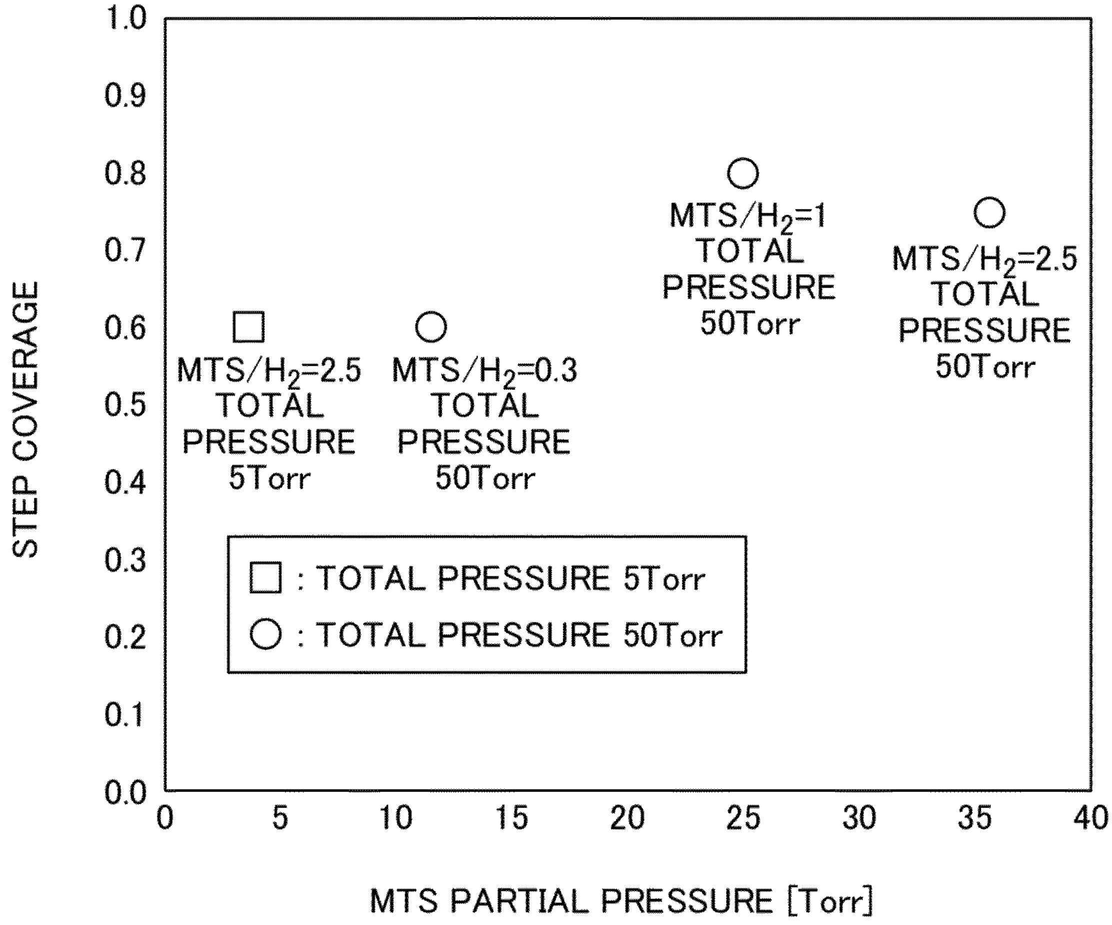
FIG. 24 is a graph showing a result of evaluating a quality of infiltration of SiC in the embodiment of the present disclosure.

FIG. 24 is a graph showing a result of evaluating a quality of infiltration of SiC. In the graph of FIG. 24, a partial pressure of MTS is put on the horizontal axis and a step coverage is put on the vertical axis to show the step coverages of the films by the film growth conditions 1 through 4.

In the film growth condition 1, the step coverage was 0.60. In the film growth condition 2, the step coverage was 0.75. In the film growth condition 3, the step coverage was 0.80. In the film growth condition 4, the step coverage was 0.60. As seen above, the qualities of infiltration of SiC in the film growth conditions 2 through 4 were equal or superior to that in the film growth condition 1. The qualities of infiltration of SiC in the film growth conditions 2 and 3 were improved as compared with the film growth conditions 1 and 4. The quality of infiltration of SiC in the film growth condition 3 was further improved as compared with the film growth condition 2. The qualities of infiltration of SiC by film growth at the infiltration pressure of 50 Torr in total pressure was thus improved as compared with that by 5 Torr in total pressure.

(Film Growth Rate Evaluation Result)

Figure 25:
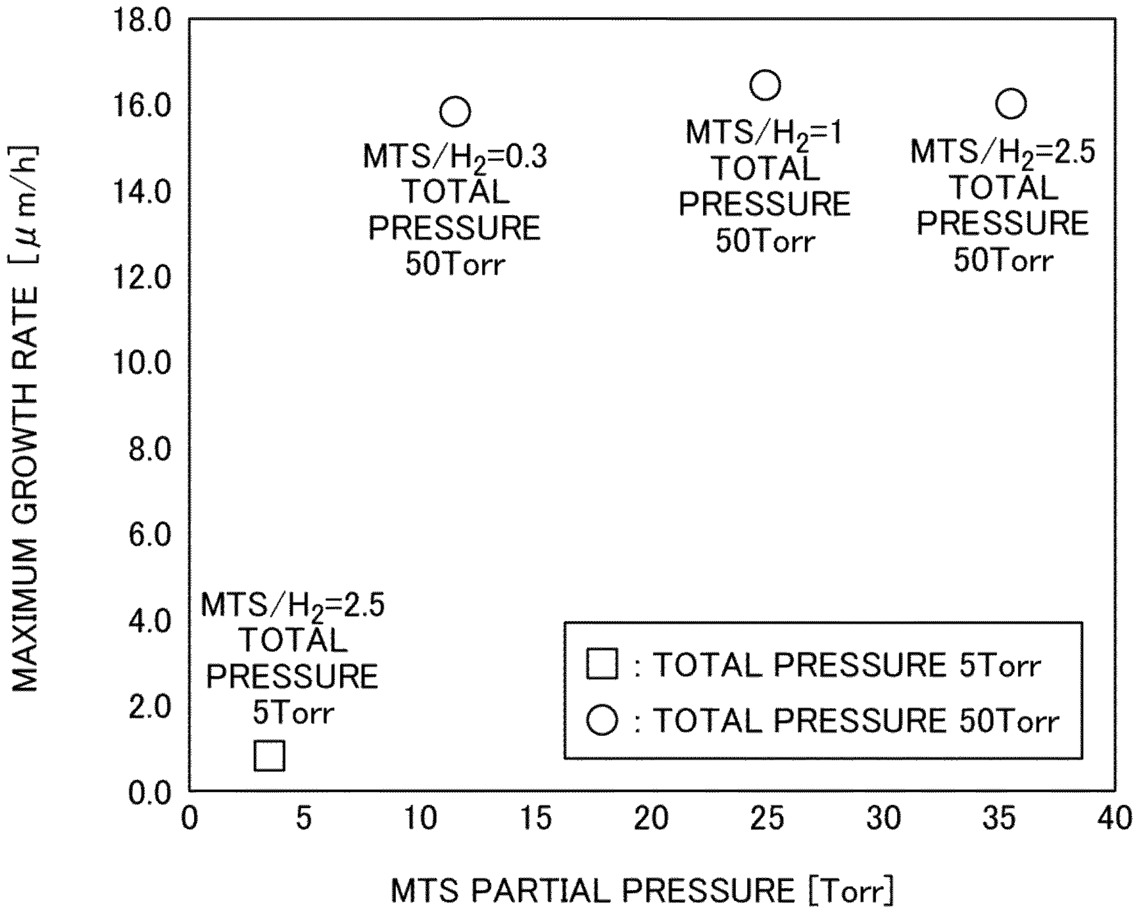
FIG. 25 is a graph showing a result of evaluating a film growth rate of SiC in the embodiment of the present disclosure.

FIG. 25 is a graph showing a result of evaluating a film growth rate of SiC. In the graph of FIG. 25, a partial pressure of MTS is put on the horizontal axis and a maximum film growth rate is put on the vertical axis to show the maximum film growth rates of SiC in films by the film growth conditions 1 through 4.

In the film growth condition 1, the maximum film growth rate was 0.77 μm/h. In the film growth condition 2, the maximum film growth rate was 15.9 μm/h. In the film growth condition 3, the maximum film growth rate was 16.4 μm/h. In the film growth condition 4, the maximum film growth rate was 15.8 μm/h. As seen above, the film growth rates of SiC in film growth at the infiltration pressure of 50 Torr in total pressure was greater than that at 5 Torr in total pressure.

(Film Yield Evaluation Result)

Figure 26:
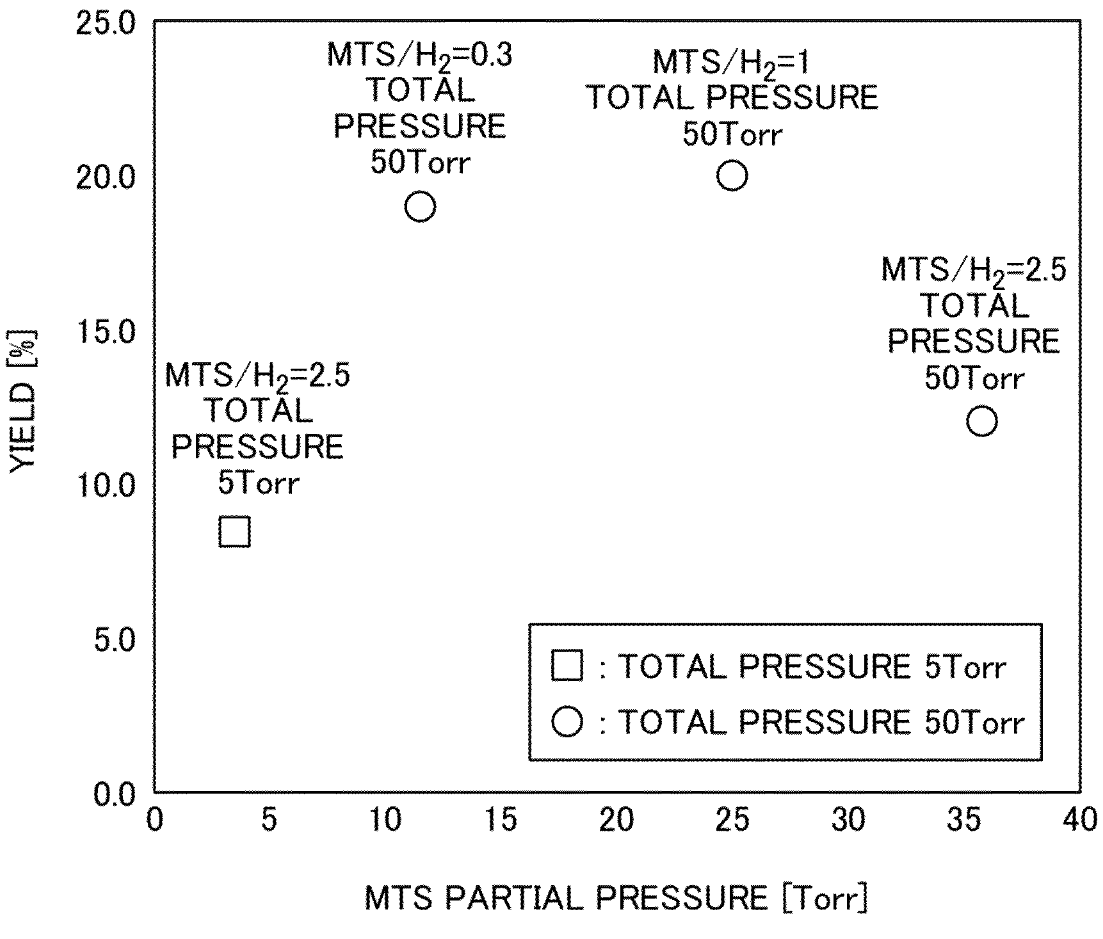
FIG. 26 is a graph showing a result of evaluating a yield of a film of SiC in the embodiment of the present disclosure.

FIG. 26 is a graph showing a result of evaluating a yield of a film of SiC. In the graph of FIG. 26, a partial pressure is put on the horizontal axis and a yield of a film is put on the vertical axis to show the yields of SiC grown by the film growth conditions 1 through 4.

In the film growth condition 1, the yield of the film was 8.4%. In the film growth condition 2, the yield of the film was 11.9%. In the film growth condition 3, the yield of the film was 19.8%. In the film growth condition 4, the yield of the film was 19.0%. As seen above, the yield of the film grown at the infiltration pressure of 50 Torr in total pressure was improved as compared with that at 5 Torr in total pressure.

(By-Product Evaluation Result)

Figure 27:
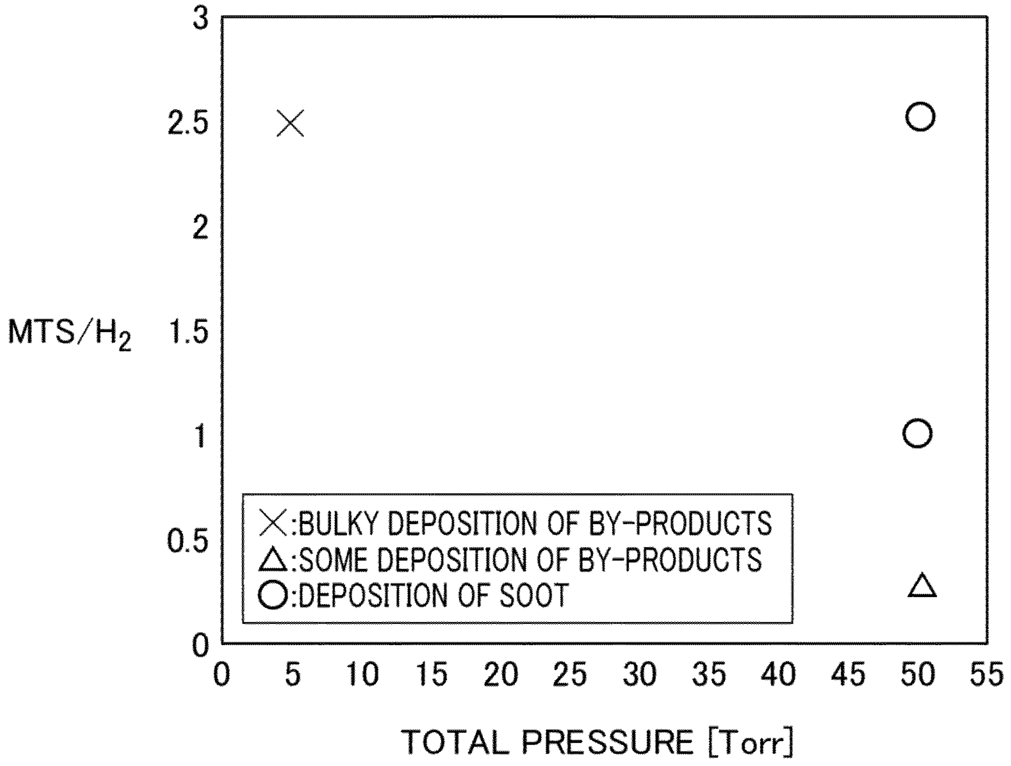
FIG. 27 is a graph showing a result of evaluating a reaction by-product in the embodiment of the present disclosure.

FIG. 27 is a graph showing a result of evaluating a reaction by-product. In the graph of FIG. 27, an infiltration pressure is put on the horizontal axis and $MTS/H_2$ is put on the vertical axis to show production of the by-products under the film growth conditions 1 through 4.

In the film growth condition 1, the by-products were deposited in large quantity on the exhaust tubing at the room temperature. In the film growth condition 2, the by-products disappeared and instead soot were deposited. In the film growth condition 3, the by-products disappeared and instead soot were deposited. In the film growth condition 4, the by-products were deposited in small quantity on the exhaust tubing at the room temperature. As seen above, it is understood that film growth at the infiltration pressure of 50 Torr in total pressure can reduce production of the by-products as compared with the infiltration pressure of 5 Torr in total pressure.

Although certain embodiments have been described above, modifications and variations of the embodiments described above will occur to those skilled in the art, in light of the above teachings.

What is claimed is:

1. A method for covering a fiber body formed of carbon or silicon carbide filaments, comprising:

an impregnation condition determination process for, at a time of carrying out a chemical vapor infiltration in between each of the filaments in the fiber body to cover the fiber body with a ceramic, determining an infiltration temperature and an infiltration pressure that maximizes a film growth rate and distribution of the ceramic throughout the fiber body relative to the infiltration temperature; and an infiltration step for supplying a film gas including an ingredient of the ceramic to carry out the chemical vapor infiltration at the infiltration temperature and the infiltration pressure determined in the impregnation condition determination process, wherein the ceramic is SiC and the ingredient of the ceramic is methyltrichlorosilane, and wherein, in the infiltration step, the infiltration temperature is from 800 degrees C. to 1000 degrees C., and the infiltration pressure is 50 Torr or more in total pressure.

2. The method for covering the fiber body as recited in claim 1, wherein the impregnation condition determination process determines an infiltration temperature and an infiltration pressure that maximizes the film growth rate of the ceramic throughout the fiber body.

3. The method for covering the fiber body as recited in claim 1, wherein the infiltration step executes the chemical vapor infiltration to infiltrate the ceramic in between fiber bundles and in between fibers in the fiber bundles in parallel.

4. The method for covering the fiber body as recited in claim 1, wherein, in the infiltration step, the infiltration temperature is from 800 degrees C. to 1000 degrees C., and the infiltration pressure is from 50 Torr to 80 Torr in total pressure.

5. The method for covering the fiber body as recited in claim 1, wherein, in the infiltration step, the infiltration temperature is from 800 degrees C. to 950 degrees C., and the infiltration pressure is from 50 Torr to 80 Torr in total pressure.

6. The method for covering the fiber body as recited in claim 1, wherein, in the infiltration step, the infiltration temperature is from 800 degrees C. to 900 degrees C., and the infiltration pressure is from 50 Torr to 80 Torr in total pressure.

7. The method for covering the fiber body as recited in claim 1, wherein, in the infiltration step, the infiltration temperature is from 850 degrees C. to 1000 degrees C., and the infiltration pressure is 50 Torr in total pressure.

8. The method for covering the fiber body as recited in claim 1, wherein, in the infiltration step, the infiltration temperature is 800 degrees C., and the infiltration pressure is 80 Torr in total pressure.

9. The method for covering the fiber body as recited in claim 1, wherein, in the infiltration step, the infiltration temperature is from 800 degrees C. to 900 degrees C., and the infiltration pressure is 50 Torr in total pressure.

10. The method for covering the fiber body as recited in claim 1, wherein:

the film gas includes methyltrichlorosilane and hydrogen; and the infiltration pressure is from 0.3 to 2.5 in MTS/H2 as a partial pressure ratio of methyltrichlorosilane to hydrogen.

11. The method for covering the fiber body as recited in claim 10, wherein the infiltration pressure is from 1.0 to 2.5 in MTS/H2 as a partial pressure ratio of methyltrichlorosilane to hydrogen.

12. The method for covering the fiber body as recited in claim 10, wherein the infiltration pressure is 1.0 in MTS/H2 as a partial pressure ratio of methyltrichlorosilane to hydrogen.

13. The method for covering the fiber body as recited in claim 1, wherein the impregnation condition determination process comprises:

a fiber body model setting step for setting a model of the fiber body;

an ingredient model setting step for setting a model of the ingredient;

an ingredient diffusion model setting step for setting an ingredient diffusion model at a time of supplying and diffusing the ingredient to the fiber body;

a reaction model setting step for setting a reaction model at a time of carrying out a film growth of the ceramic from the ingredient diffused in the fiber body;

an ingredient concentration distribution calculation step for calculating an ingredient concentration diffusion of the ingredient diffused in the fiber body;

a film growth rate calculation step for calculating a film growth rate of the ceramic throughout the fiber body; and an infiltration condition determination step for determining an infiltration temperature and an infiltration pressure that maximizes a film growth rate of the ceramic throughout the fiber body relative to the infiltration temperature.

* * * * *